(12) United States Patent
Lee et al.

(10) Patent No.: US 11,991,753 B2
(45) Date of Patent: May 21, 2024

(54) METHOD AND APPARATUS FOR PERFORMING RANDOM ACCESS PROCEDURE IN WIRELESS COMMUNICATION SYSTEM

(71) Applicant: LG ELECTRONICS INC., Seoul (KR)

(72) Inventors: Youngdae Lee, Seoul (KR); Jaehyung Kim, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/108,502

(22) Filed: Feb. 10, 2023

(65) Prior Publication Data

US 2023/0239931 A1    Jul. 27, 2023

Related U.S. Application Data

(63) Continuation of application No. PCT/KR2022/006770, filed on May 11, 2022.

(30) Foreign Application Priority Data

May 11, 2021    (KR) .................. 10-2021-0060703

(51) Int. Cl.
*H04W 4/00*     (2018.01)
*H04W 74/0833*  (2024.01)

(52) U.S. Cl.
CPC .............. *H04W 74/0833* (2013.01)

(58) Field of Classification Search
CPC ........... H04W 74/0833; H04W 74/008; H04W 24/08; H04W 48/08; H04W 72/0446;
(Continued)

(56) References Cited

U.S. PATENT DOCUMENTS 7,885,228 B2 *  2/2011  Walton .................. H04L 1/0025
                                                       455/562.1
11,071,147 B2 *  7/2021  He ........................ H04W 72/12
(Continued)

FOREIGN PATENT DOCUMENTS

EP          3613252 B1 *  5/2021  ............ H04W 48/16
KR    10-2021-0010842 A     1/2021
(Continued)

OTHER PUBLICATIONS

"3rd Generation Partnership Project; Technical Specification Group Radio Access Network; NR; Medium Access Control (MAC) protocol specification (Release 16)", 3GPP TS 38.321 V16.4.0 (Mar. 2021), Mar. 29, 2021, see pp. 141-144.

*Primary Examiner* — Thai D Hoang
(74) *Attorney, Agent, or Firm* — BRYAN CAVE LEIGHTON PAISNER LLP

(57) ABSTRACT

Disclosed are a method and apparatus for performing a random access procedure in a wireless communication system. The method for performing a random access procedure according to an embodiment of the present disclosure may comprise the steps of: receiving, from a base station, configuration information related to random access, wherein the configuration information includes a scaling factor for a back-off indicator (BI) for a specific type of terminal; transmitting a first random access preamble to the base station; receiving, from the base station, a random access response (RAR) in response to the first random access preamble, wherein the RAR includes the BI; and on the basis of the RAR not including a random access preamble identifier (RAPID) associated with the first random access preamble, transmitting a second random access preamble to the base station.

8 Claims, 16 Drawing Sheets

(58) Field of Classification Search
CPC ... H04W 72/51; H04W 72/53; H04W 74/004; H04W 74/006; Y02D 30/70
See application file for complete search history.

(56) References Cited

U.S. PATENT DOCUMENTS

| | | | | |
|---|---|---|---|---|
| 2013/0188582 A1* | 7/2013 | Dinan | ................... | H04W 72/27 370/329 |
| 2013/0188620 A1* | 7/2013 | Dinan | ................... | H04W 72/23 370/336 |
| 2016/0192361 A1* | 6/2016 | Dinan | ................ | H04L 41/0681 370/329 |
| 2018/0167890 A1* | 6/2018 | Dinan | ................ | H04L 27/2602 |
| 2018/0184384 A1* | 6/2018 | Dinan | ................... | H04W 76/27 |
| 2018/0279376 A1* | 9/2018 | Dinan | ................... | H04W 52/50 |
| 2020/0169960 A1* | 5/2020 | Dinan | ............... | H04W 56/0045 |
| 2020/0221506 A1* | 7/2020 | Jeon | ................... | H04W 74/0808 |
| 2020/0351955 A1* | 11/2020 | Jeon | ..................... | H04L 5/0092 |
| 2021/0076383 A1 | 3/2021 | Wong et al. | | |
| 2021/0099991 A1 | 4/2021 | Liu et al. | | |
| 2021/0136770 A1 | 5/2021 | Nakashima et al. | | |
| 2021/0250989 A1* | 8/2021 | Chin | ..................... | H04W 72/21 |
| 2022/0210806 A1* | 6/2022 | Rastegardoost | ...... | H04L 5/0051 |
| 2022/0279453 A1* | 9/2022 | Dinan | .................... | H04L 1/1671 |

FOREIGN PATENT DOCUMENTS

| | | | | |
|---|---|---|---|---|
| WO | WO-2013112952 A1 * | 8/2013 | ............. | H04L 27/18 |
| WO | WO-2018175809 A1 * | 9/2018 | ........ | H04W 36/0077 |
| WO | WO-2019032001 A1 * | 2/2019 | ............. | H04L 41/08 |
| WO | WO-2019062779 A1 * | 4/2019 | .......... | H04W 5/0048 |
| WO | WO-2020142683 A1 * | 7/2020 | ........ | H04W 72/1263 |
| WO | WO-2020249548 A1 * | 12/2020 | .......... | H04W 56/001 |
| WO | WO-2021006804 A1 * | 1/2021 | ............ | H04W 24/02 |
| WO | WO-2021030804 A1 * | 2/2021 | ............ | H04L 1/1671 |
| WO | WO-2022240197 A1 * | 11/2022 | | |

* cited by examiner (a)

| PRACH configuration index | Symbol Index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|---|
| | 81 | A1 | A1 | A1 | A1 | A1 | A1 | | | | | | | | |
| | 82 | | | | | | | | A1 | A1 | A1 | | | | |
| | 100 | | | | | | | | | | A2 | | | | |
| | 101 | A2 | | | A2 | | | A2 | | | | | | | |
| | 127 | A3 | | | | A3 | | | | | | | | | |
| | 128 | | | | | | A3 | | | | | | | | |
| | 142 | | B1 | B1 | B1 | B1 | B1 | B1 | | | | | | | |
| | 143 | | | | | | B1 | B1 | B1 | | | | | | |
| | 221 | | A1 | A1 | A1 | A1 | A1 | B1 | | | | | | | |
| | 222 | | | | | | A1 | A1 | B1 | | | | | | |
| | 235 | A2 | | | A2 | | | B2 | | | | | | | |
| | 236 | | | | | | A2 | | B2 | | | | | | |
| | 251 | A3 | | | | B3 | | | | | | | | | |
| | 252 | | | A3 | | | B3 | | | | | | | | |

RACH slot (1ms)

METHOD AND APPARATUS FOR PERFORMING RANDOM ACCESS PROCEDURE IN WIRELESS COMMUNICATION SYSTEM

CROSS-REFERENCE TO RELATED APPLICATIONS

This application is a Continuation Application of International Application No. PCT/KR2022/006770, filed on May 11, 2022, which claims the benefit of earlier filing date and right of priority to Korean Application No. 10-2021-0060703, filed on May 11, 2021, the contents of which are all hereby incorporated by reference herein in their entirety.

TECHNICAL FIELD

The present disclosure relates to a wireless communication system, and in more detail, relates to a method and an apparatus of performing a random access procedure in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus for performing a random access procedure.

In addition, a technical object of the present disclosure is to provide a method and an apparatus for performing a random access procedure of a specific type of terminal having a reduced or limited capability.

In addition, a technical object of the present disclosure is to provide a method for deferring a random access procedure of a (specific type) terminal or configuring limited random access parameters.

The technical objects to be achieved by the present disclosure are not limited to the above-described technical objects, and other technical objects which are not described herein will be clearly understood by those skilled in the pertinent art from the following description.

A method of performing a random access procedure in a wireless communication system according to an aspect of the present disclosure, the method performed by a terminal may include: receiving, from a base station, configuration information related to random access, wherein the configuration information includes a scaling factor for a back-off indicator (BI) for a specific type of terminal; transmitting, to the base station, a first random access preamble; receiving, from the base station, a random access response (RAR) as a response to the first random access preamble, wherein the RAR includes a BI; and transmitting, to the base station, a second random access preamble based on the RAR not including a random access preamble identifier (RAPID) associated with the first random access preamble. The second random access preamble may be transmitted after a backoff time for which the scaling factor is applied to the BI.

A method of performing a random access procedure in a wireless communication system according to another aspect of the present disclosure, the method performed by a base station may include: transmitting, to a specific type of terminal, configuration information related to random access, wherein the configuration information includes a scaling factor for a back-off indicator (BI) for the specific type of terminal; receiving, from the specific type of terminal, a first random access preamble; transmitting, to the specific type of terminal, a random access response (RAR) as a response to the first random access preamble, wherein the RAR includes a BI; and receiving, from the specific type of terminal, a second random access preamble based on the RAR not including a random access preamble identifier (RAPID) associated with the first random access preamble. The second random access preamble may be transmitted after a backoff time for which the scaling factor is applied to the BI.

According to an embodiment of the present disclosure, a random access procedure of a specific type of terminal can be supported.

In addition, according to an embodiment of the present disclosure, cell congestion can be controlled by deferring a random access procedure of a (specific type) terminal or by configuring limited random access parameters.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 11 illustrates a configuration of a RACH occasion in one RACH slot.

DETAILED DESCRIPTION

Figure 1:
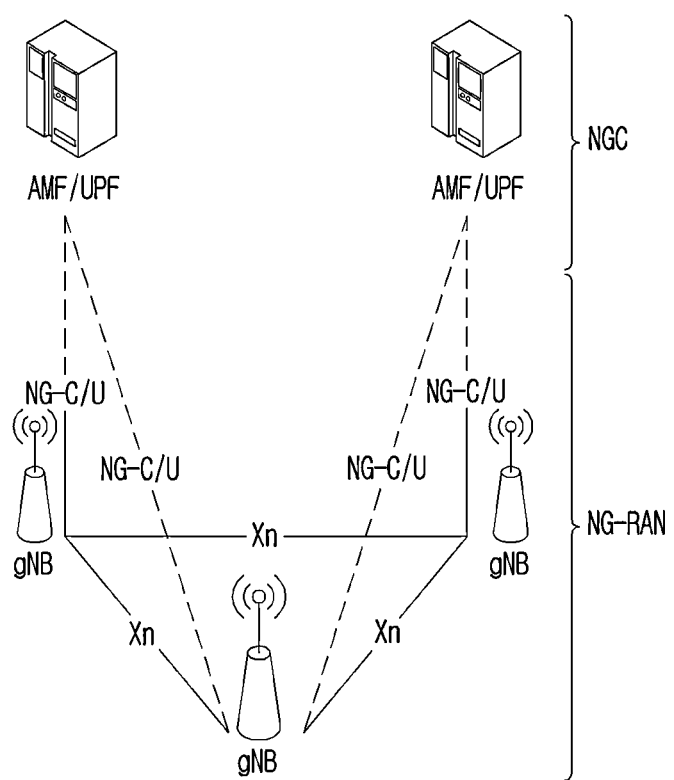
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
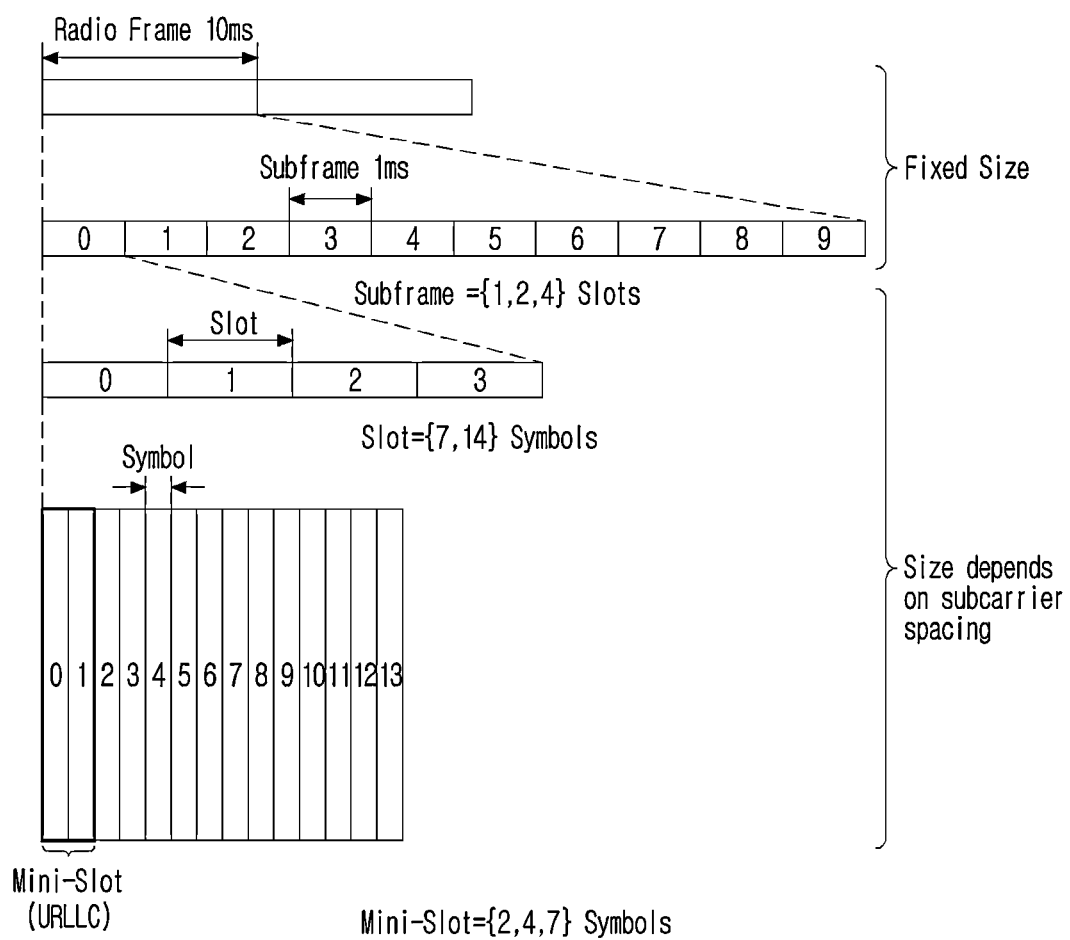
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, p). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described.

A plurality of OFDM numerologies supported in a NR system may be defined as in the following Table 1.

TABLE 1

| μ | Δf = $2^μ$ · 15 [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmμ).

TABLE 2

| Frequency Range designation | Corresponding frequency range | Subcarrier Spacing |
|---|---|---|
| FR1 | 410 MHz–7125 MHz | 15, 30, 60 kHz |
| FR2 | 24250 MHz–52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·103 Hz and $N_f$ is 4096. Downlink and uplink transmission is configured (organized) with a radio frame having a duration of $T_f=1/(\Delta f_{max} N_f/100) \cdot T_c = 10$ ms. Here, a radio frame is configured with subframes having a duration of $T_{sf}=(\Delta f_{max} N_f/1000) \cdot T_c = 1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration p, slots are numbered in an increasing order of $n_s^μ \in \{0, \ldots, N_{slot}^{subframe,μ}-1\}$ in a subframe and are numbered in an increasing order of $n_{s,f}^μ \in \{0, \ldots, N_{slot}^{subframe,μ}-1\}$ in a radio frame. One slot is configured with $N_{symb}^{slot}$ consecutive OFDM symbols and $N_{symb}^{slot}$ is determined according to CP. A start of a slot $n_s^μ$ in a subframe is temporally arranged with a start of an OFDM symbol $n_s^μ N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,μ}$) and the number of slots per subframe ($N_{slot}^{subframe,μ}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,μ}$ | $N_{slot}^{subframe,μ}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
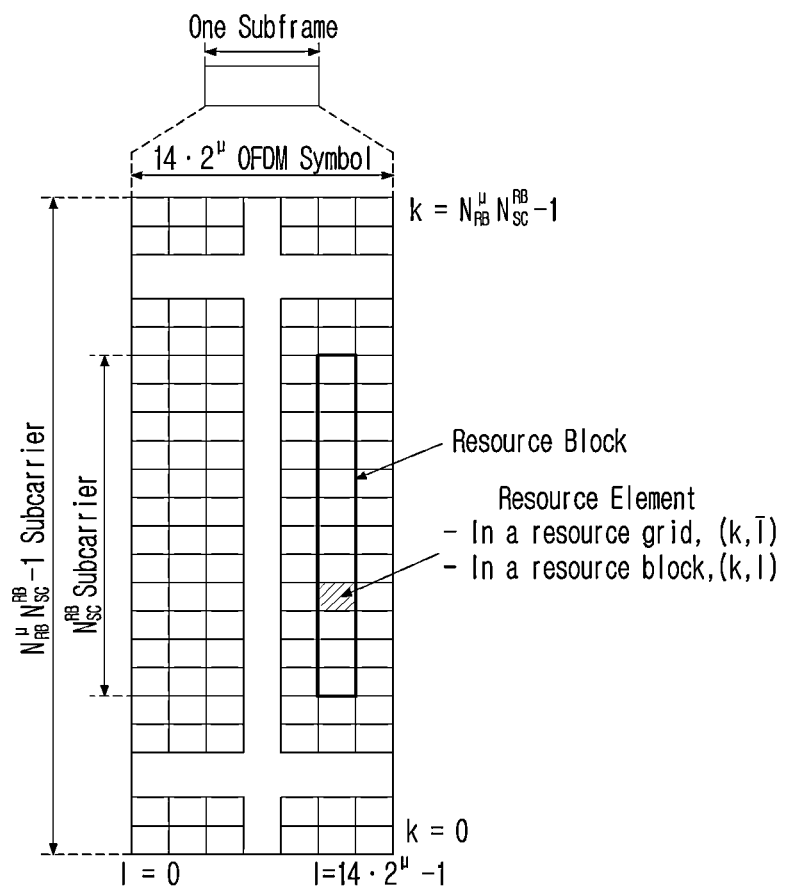
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^μ N_{sc}^{RB}$ subcarriers in a frequency domain and one subframe is configured with 14·$2^μ$ OFDM symbols, but it is not limited thereto. In an NR system, a transmitted signal is described by OFDM symbols of $2^μ N_{symb}^{(μ)}$ and one or more resource grids configured with $N_{RB}^μ N_{sc}^{RB}$ subcarriers. Here, $N_{RB}^μ \leq N_{RB}^{max,μ}$. The $N_{RB}^{max,μ}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k, l'). Here, k=0, . . . , $N_{RB}^μ N_{sc}^{RB}-1$ is an index in a frequency domain and l'=0, . . . , $2μN_{symb}(μ)-1$ refers to a position of a symbol in a subframe. When referring to a resource element in a slot, an index pair (k,l) is used. Here, l=0, . . . , $N_{symb}^μ-1$. A resource element (k,l') for μ and an antenna port p corresponds to a complex value, $a_{k,l'}^{(p,μ)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{SC}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration µ. The center of subcarrier 0 of common resource block 0 for a subcarrier spacing configuration µ is identical to 'point A'. A relationship between a common resource block number $n_{CRB}^{\mu}$ and a resource element (k,l) for a subcarrier spacing configuration µ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
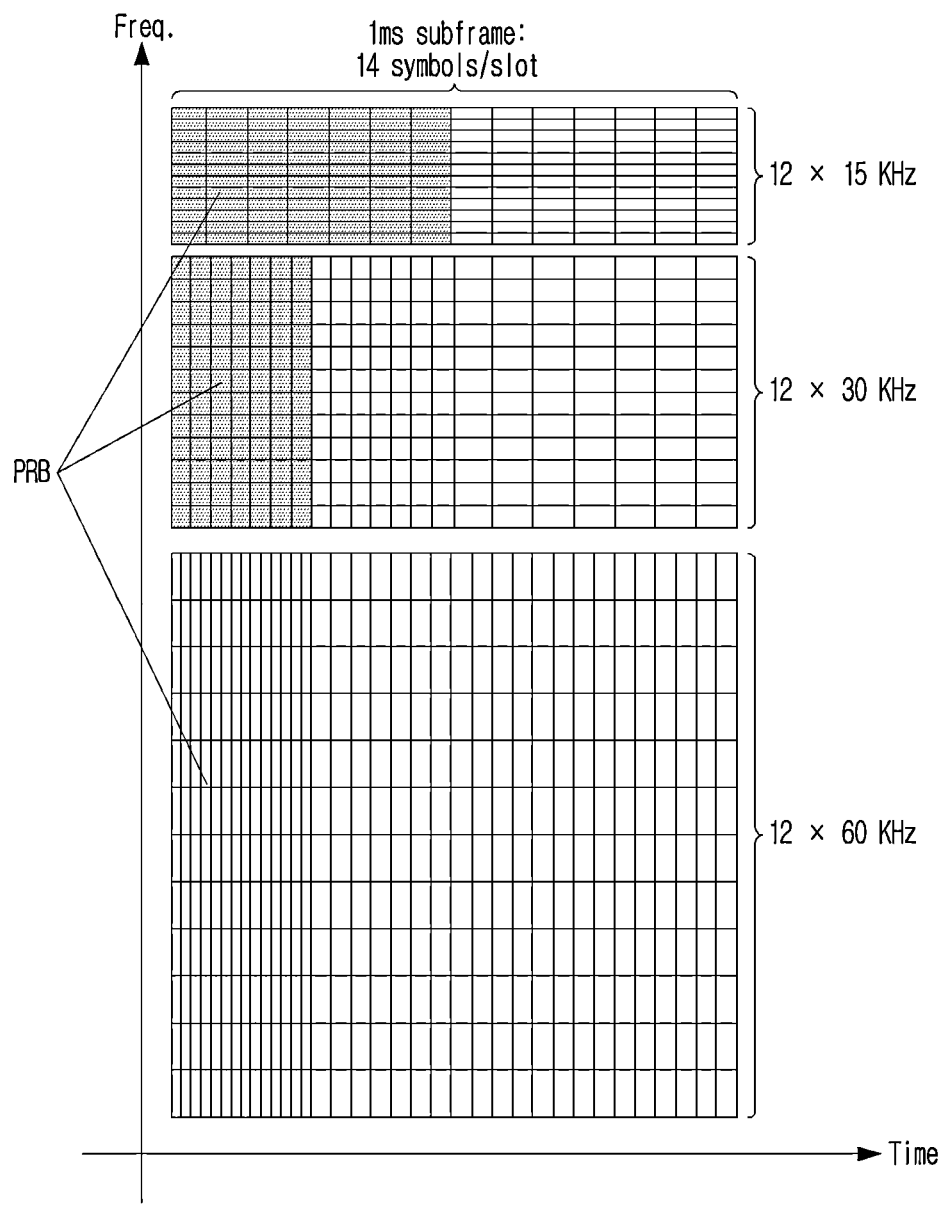
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
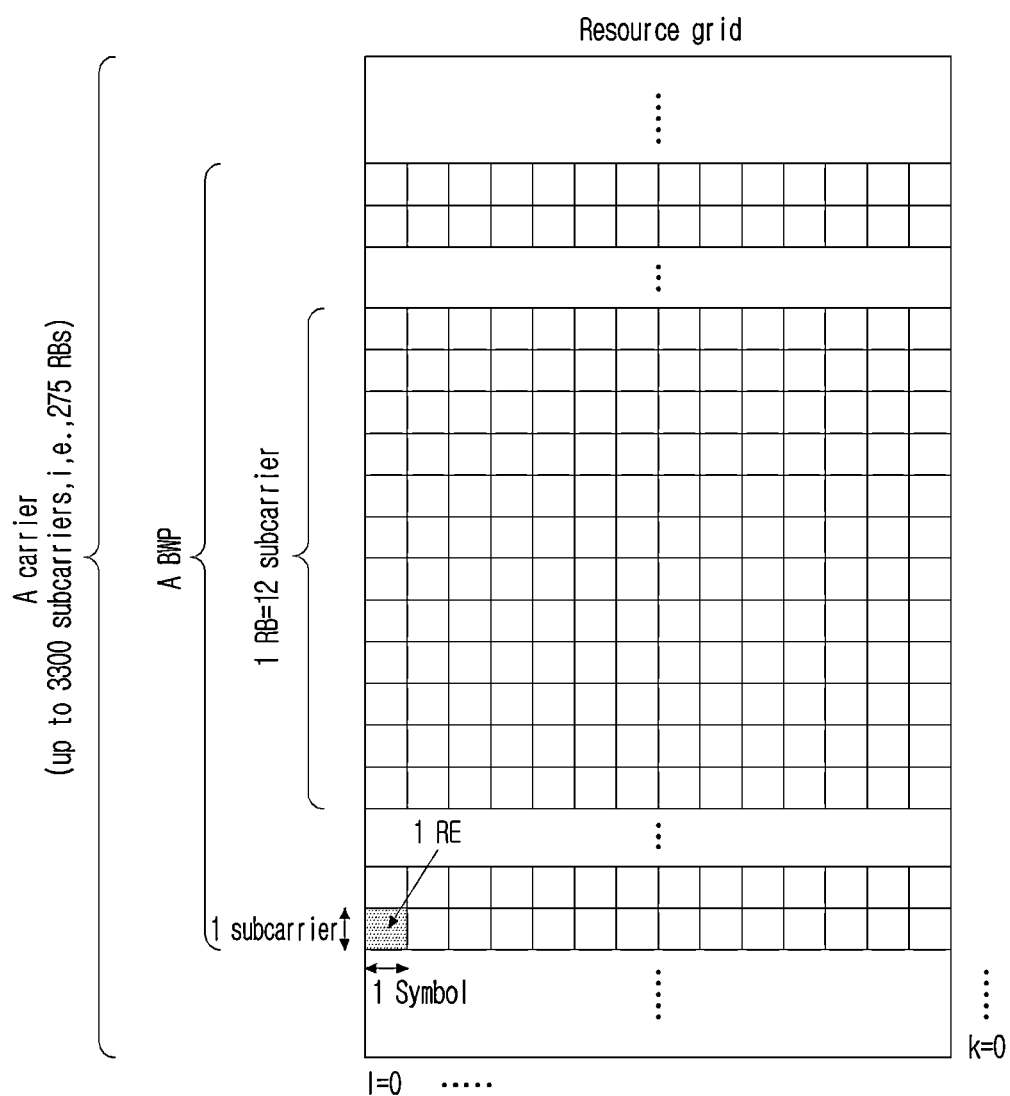
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC.

Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
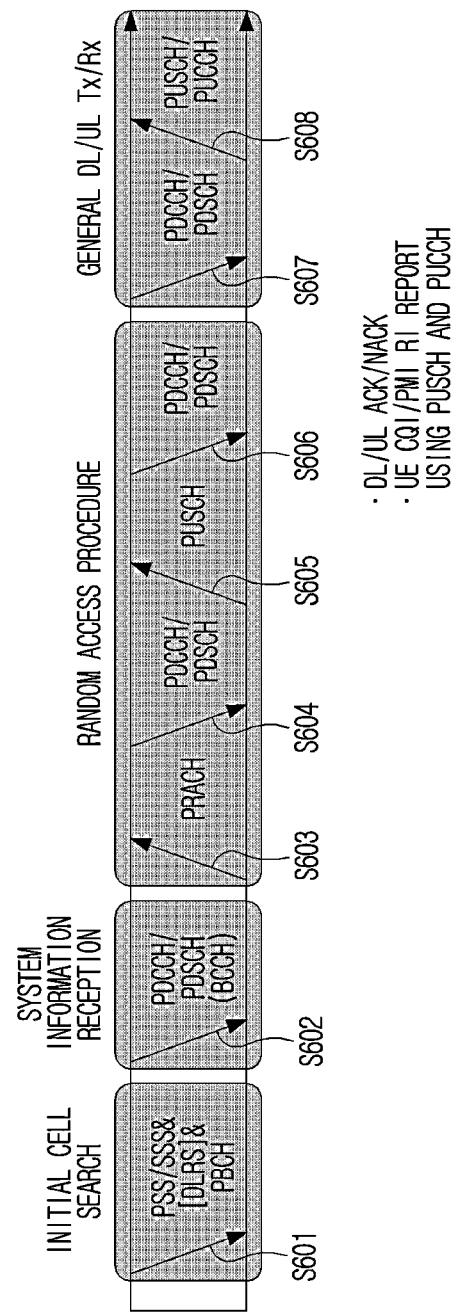
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 10, 1_1 and 1_2 may include resource information (e.g., frequency resource allocation, time resource allocation, VRB (virtual resource block)—PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Quasi-Co Locaton (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A quasi co-location type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port(s) is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

System Information Acquisition

Figure 7:
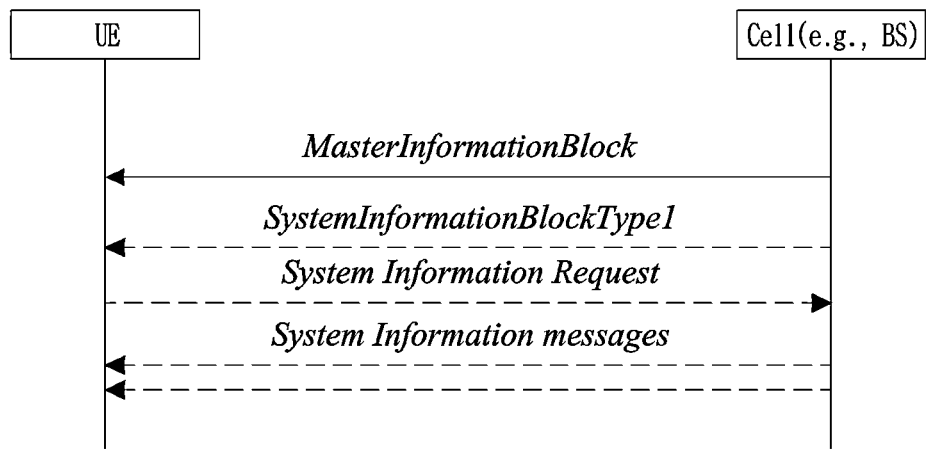
FIG. 7 illustrates a system information acquisition process.

FIG. 7 illustrates a system information acquisition process.

A UE may obtain access stratum (AS)/non-access stratum (NAS) information through a system information (SI) acquisition process. A SI acquisition process may be applied to a UE in an RRC idle (RRC_IDLE) state, an RRC inactive (RRC_INACTIVE) state, and an RRC connected (RRC_CONNECTED) state.

SI is divided into a master information block (MIB) and a plurality of system information blocks (SIB). SI other than an MIB may be referred to as Remaining Minimum System Information (RMSI) and Other System Information (OSI). RMSI corresponds to SIB1, and OSI refers to SIBs other than SIB2 and higher than SIB2. For details, the following may be referenced.

An MIB includes information/parameters related to SIB1 (SystemInformationBlockType1) reception and is transmitted through a PBCH of an SSB (SS/PBCH block). MIB information may include fields shown in Table 6.

Table 6 illustrates a portion of an MIB.

TABLE 6

| | |
|---|---|
| - subCarrierSpacingCommon | ENUMERATED {scs15or60, scs30or120}, |
| - ssb-SubcarrierOffset | INTEGER (0..15), |
| - pdcch-ConfigSIB1 | INTEGER (0..255), |

Table 7 illustrates a description of MIB fields illustrated in Table 6.

TABLE 7 pdcch-ConfigSIB1
The field pdcch-ConfigSIB1 determines a common ControlResourceSet (CORESET), a common search space and necessary PDCCH parameters.
If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1
ssb-SubcarrierOffset.
The field ssb-SubcarrierOffset corresponds to k SSB, which is the frequency domain offset (number of subcarriers) between SSB and the overall resource block grid.
The value range of the field ssb-SubcarrierOffset may be extended by an additional most significant bit encoded within PBCH.
The field ssb-SubcarrierOffset may indicate that this cell does not provide SIB1 and that there is hence no CORESET#0

TABLE 7-continued configured in MIB. In this case, the field pdcch-ConfigSIB1 may indicate the frequency positions where the UE may (not) find a SS/PBCH with a control resource set and search space for SIB1.
subCarrierSpacingCommon
The field subCarrierSpacingCommon indicates subcarrier spacing for SIB1, Msg.2/4 and MsgB for initial access, paging and broadcast SI-messages. If the UE acquires this MIB on an FR1 carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz.

Upon initial cell selection, a UE assumes that half-frames with an SSB are repeated in a period of 20 ins. A UE may check whether a Control Resource Set (CORESET) exists for the Type0-PDCCH common search space based on an MIB. The Type0-PDCCH common search space is a type of PDCCH search space and is used to transmit a PDCCH for scheduling an SI message. When the Type0-PDCCH common search space exists, a UE may determine (i) a plurality of contiguous RBs and one or more contiguous symbols constituting a CORESET and (ii) a PDCCH occasion (i.e., time domain location for PDCCH reception) based on information in an MIB (e.g., pdcch-ConfigSIB1). Specifically, pdcch-ConfigSIB1 is 8-bit information, (i) is determined based on 4 bits of MSB (Most Significant Bit) (refer to 3GPP TS 38.213 Table 13-1-13-10), and (ii) is determined based on 4 bits of LSB (Least Significant Bit) (refer to 3GPP TS 38.213 Table 13-11-13-15).

As an example, information indicated by MSB 4 bits of pdcch-ConfigSIB1 is exemplified as follows.

A configuration of a CORESET for the Type0-PDCCH common search space is:
  i) Define multiple tables according to subcarrier spacing and channel minimum bandwidth.
  ii) Indicates a multiplexing pattern between an SS/PBCH block and a PDCCH/PDSCH.
    Pattern 1: All SCS combinations for FR1, all SCS combinations for FR2
    Pattern 2: Different SCS combinations for FR2 (except for the combination of 60 kHz for an initial DL BWP and 240 kHz SCS for a SS/PBCH block)
    Pattern 3: Same SCS combination for FR2 (for 120 kHz SCS)
  iii) indicates the number of PRBs and OFDM symbols for a CORESET.
    $N_{RB}^{CORESET}$: number of RBs (i.e. {24, 48, 96})
    $N_{Symb}^{CORESET}$ number of symbols (i.e. {1, 2, 3})
  iv) Indicates an offset (the number of RBs) between the first RB of an SS/PBCH block and the first RB of an RMSI CORESET.
    A range of an offset (number of RBs) is determined by the number of PRBs and sync raster0.
    Design to align a center of an SS/PBCH block and a center of an RMSI CORESET as close as possible.

When the Type0-PDCCH common search space does not exist, pdcch-ConfigSIB1 provides information on a frequency location where an SSB/SIB1 exists and a frequency range where an SSB/SIB1 does not exist.

In the case of initial cell selection, a UE may assume that a half frame with an SS/PBCH block occurs with a period of 2 frames. Upon detection of an SS/PBCH block, if $k_{SSB} \leq 23$ for FR1 (Sub-6 GHz; 450 to 6000 MHz) and $k_{SSB} \leq 11$ for FR2 (mm-Wave, 24250 to 52600 MHz), a UE determines that a control resource set for the Type0-PDCCH common search space exists. If $k_{SSB}$>23 for FR1 and $k_{SSB}$>11 for FR2, a UE determines that a control resource set for the Type0-PDCCH common search space does not exist. $k_{SSB}$ represents a frequency/subcarrier offset between subcarrier 0 of an SS/PBCH block and subcarrier 0 of a common resource block for an SSB. For FR2, only a maximum of 11 values can be applied. $k_{SSB}$ can be signaled through an MIB. An SIB1 includes information related to availability and scheduling (e.g., transmission period, SI-window size) of the remaining SIBs (hereinafter, SIBx, where x is an integer greater than or equal to 2). For example, an SIB1 may inform whether SIBx is periodically broadcast or provided at a request of a UE by an on-demand scheme. When SIBx is provided by an on-demand method, an SIB1 may include information necessary for a UE to perform an SI request. An SIB1 is transmitted through a PDSCH, a PDCCH scheduling the SIB1 is transmitted through the Type0-PDCCH common search space, and the SIB1 is transmitted through a PDSCH indicated by a PDCCH.

SIBx is included in an SI message and transmitted through a PDSCH. Each SI message is transmitted within a periodically occurring time window (i.e., SI-window).

Random Access Operation and Related Operation

When there is no PUSCH transmission resource (i.e., uplink grant) allocated by a base station, a UE may perform a random access operation. Random access of the NR system may be initiated 1) when a UE requests or resumes an RRC connection, 2) when a UE performs handover to a neighboring cell or adds a secondary cell group (SCG) (i.e., SCG addition), 3) When a UE perform a scheduling request to a base station, 4) when a base station indicates to a UE random access with a PDCCH order, 5) when a beam failure or RRC connection failure is detected.

Figure 8:
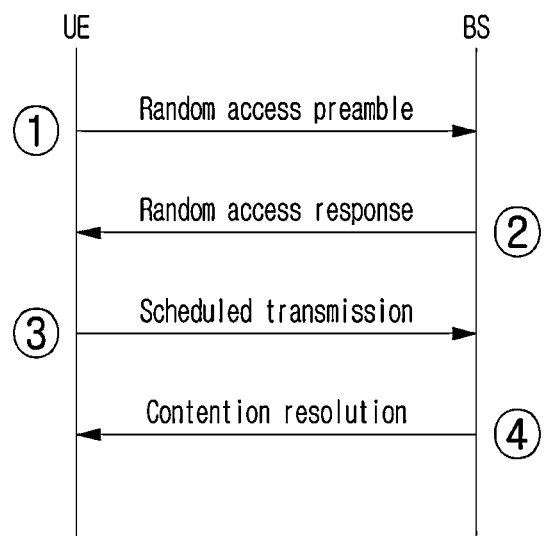
FIG. 8 illustrates a random access process in a wireless communication system to which the present disclosure may be applied.
Figure 8:
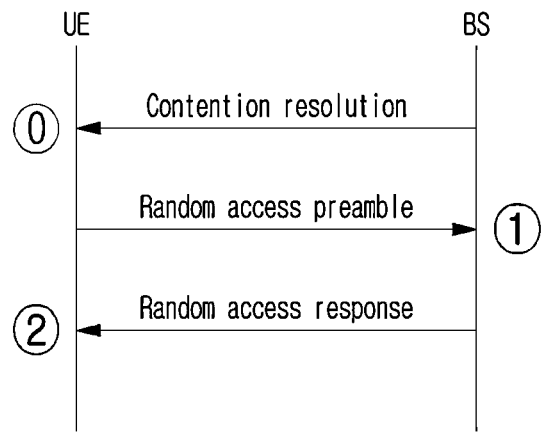

FIG. 8 illustrates a random access process in a wireless communication system to which the present disclosure may be applied. FIG. 8(a) exemplifies a contention-based random access process, and FIG. 8(b) exemplifies a dedicated random access process.

Referring to FIG. 8(a), a contention-based random access process includes the following 4 steps. Hereinafter, messages transmitted in steps 1 to 4 may be referred to as messages (Msg) 1 to 4, respectively.

Step 1: A UE transmits a random access channel (RACH) preamble through a physical random access channel (PRACH)

Step 2: A UE receives a random access response (RAR) from a base station through a downlink shared channel (DL-SCH).

Step 3: A UE transmits a Layer 2/Layer 3 message to a base station through an uplink shared channel (UL-SCH).

Step 4: A UE receives a contention resolution message from a base station through a DL-SCH.

A UE may receive information on random access from a base station through system information.

If random access is required, a UE transmits an RACH preamble to a base station as in step 1. A base station can distinguish each of random access preambles through a time/frequency resource through which an random access preamble is transmitted (i.e., RACH occasion (RO)) and a random access preamble index (PI).

When a base station receives a random access preamble from a terminal, the base station transmits a random access response (RAR) message to the terminal as in step 2. For reception of a random access response message, in a pre-configured time window (e.g., ra-ResponseWindow), a UE monitors a CRC-masked L1/L2 control channel (PDCCH) with an RA-RNTI (Random Access-RNTI), which includes scheduling information for a random access response message. A PDCCH masked with an RA-RNTI can be transmitted only through a common search space. When receiving a scheduling signal masked with an RA-RNTI, a UE may receive a random access response message from a PDSCH indicated by scheduling information. After that, a terminal checks whether there is random access response information indicated to it in a random access response message. Whether or not random access response information indicated to a UE exists can be confirmed by whether a random access preamble ID (RAPID) for a preamble transmitted by a terminal exists. An index of a preamble transmitted by a UE and a RAPID may be the same. Random access response information includes a corresponding random access preamble index, timing offset information for UL synchronization (e.g., timing advance command (TAC)), UL scheduling information for message 3 transmission (e.g., UL grant), and UE temporary identification information (e.g., TC-RNTI (Temporary-C-RNTI)).

A UE receiving random access response information transmits UL-SCH (Shared Channel) data (message 3) through a PUSCH according to UL scheduling information and a timing offset value, as in step 3. A time and frequency resource in which a PUSCH carrying message 3 is mapped/transmitted is defined as PO (PUSCH Occasion). Message 3 may include a UE's ID (or a UE's global ID). Alternatively, message 3 may include RRC connection request-related information (e.g., an RRCSetupRequest message) for initial access. Message 3 may also include a Buffer Status Report (BSR) on an amount of data available for transmission by a UE.

After receiving UL-SCH data, as in step 4, a base station transmits a contention resolution message (message 4) to a UE. When a UE receives a contention resolution message and contention is successfully resolved, a TC-RNTI is changed to a C-RNTI. Message 4 may include an ID of a UE and/or RRC connection related information (e.g., RRCSetup message). If information transmitted through message 3 and information received through message 4 do not match, or if message 4 is not received for a certain period of time, a UE may determine that contention resolution has failed and retransmit message 3.

Referring to FIG. 8(b), a dedicated random access process includes the following three steps. Hereinafter, messages transmitted in steps 0 to 2 may be referred to as messages (Msg) 0 to 2, respectively. A dedicated random access process may be triggered by using a PDCCH (hereinafter referred to as a PDCCH order) for instructing RACH preamble transmission by a base station.

Step 0: A base station allocates a RACH preamble to a terminal through dedicated signaling.

Step 1: A UE transmits a RACH preamble through a PRACH.

Step 2: A UE receives a random access response (RAR) from a base station through a DL-SCH.

Operations of steps 1 to 2 of a dedicated random access process may be the same as steps 1 to 2 of a contention-based random access process.

In NR, DCI format 1_0 is used to initiate a non-contention based random access procedure with a PDCCH order. DCI format 1_0 is used to schedule a PDSCH in one DL cell. Meanwhile, when a Cyclic Redundancy Check (CRC) of DCI format 1_0 is scrambled with a C-RNTI and all bit values of a "Frequency domain resource assignment" field are 1, DCI format 1_0 is used as a PDCCH order indicating a random access process. In this case, fields of DCI format 1_0 are configured as follows.

RA preamble index: 6 bits

UL/SUL (Supplementary UL) indicator: 1 bit. When all bit values of a RA preamble index are not 0 and SUL is configured in a cell for a UE, a PRACH in a cell indicates a transmitted UL carrier. Otherwise, it is unused (reserved).

SSB (Synchronization Signal/Physical Broadcast Channel) index: 6 bits. When all bit values of a RA preamble index are not 0, it indicates an SSB used to determine a RACH occasion for PRACH transmission. Otherwise, it is unused (reserved).

PRACH mask index: 4 bits. When all bit values of a RA preamble index are not 0, a RACH occasion associated with an SSB indicated by an SSB index is indicated. Otherwise, it is unused (reserved).

reserved: 10 bits

When DCI format 1_0 does not correspond to a PDCCH order, DCI format 1_0 is configured with fields used for scheduling a PDSCH (e.g., Time domain resource assignment (TDRA), Modulation and Coding Scheme (MCS), HARQ process number, PDSCH-to-HARQ_feedback timing indicator, etc.).

In NR systems, lower latency than existing systems may be required. In addition, if a random access process occurs in a U-band, a random access process is terminated and contention is resolved only when a UE and a base station sequentially succeed in LBT in all of a 4-step random access process. If LBT fails in any step of a 4-step random access process, resource efficiency is lowered and latency is increased. In particular, if LBT fails in a scheduling/transmission process associated with Message 2 or Message 3, resource efficiency reduction and latency increase may occur significantly. Even in an L-band random access process, a low-latency random access process may be required in various scenarios of the NR system. Therefore, a 2-step random access process can also be performed on an L-band.

Figure 9:
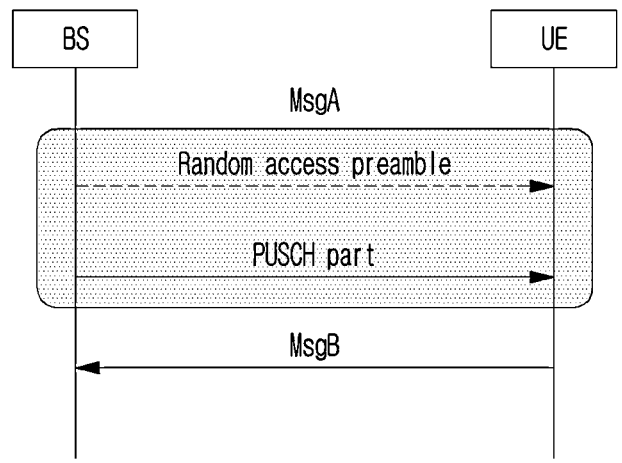
FIG. 9 illustrates a two-step random access process in a wireless communication system to which the present disclosure may be applied.
Figure 9:
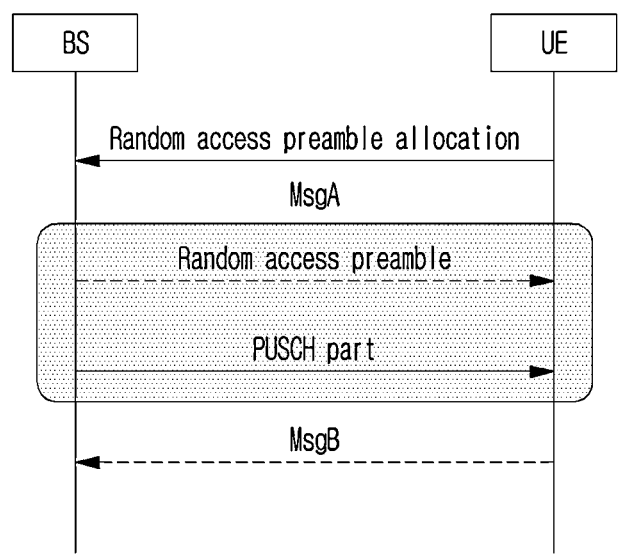

FIG. 9 illustrates a two-step random access process in a wireless communication system to which the present disclosure may be applied.

As shown in FIG. 9(a), a 2-step random access process may include two steps of transmitting an uplink signal (referred to as message A and corresponds to PRACH preamble+Msg3 PUSCH) from a UE to a base station and transmitting a downlink signal (referred to as message B and corresponding to RAR+Msg4 PDSCH) from a base station to a UE.

Also, in a non-contention random access process, as shown in FIG. 9(b), a random access preamble and a PUSCH part may be transmitted together.

Although not shown in FIG. 9, a PDCCH for scheduling message B may be transmitted from a base station to a UE, which may be referred to as Msg. B PDCCH.

Meanwhile, a PRACH format for transmitting a PRACH preamble in the NR system includes a format composed of a length 839 sequence (referred to as a long RACH format for convenience) and a format composed of a length 139 sequence (referred to as a short RACH format for convenience). For example, in FR1, SCS of the corresponding short RACH format is defined as 15 or 30 kHz.

Figure 10:
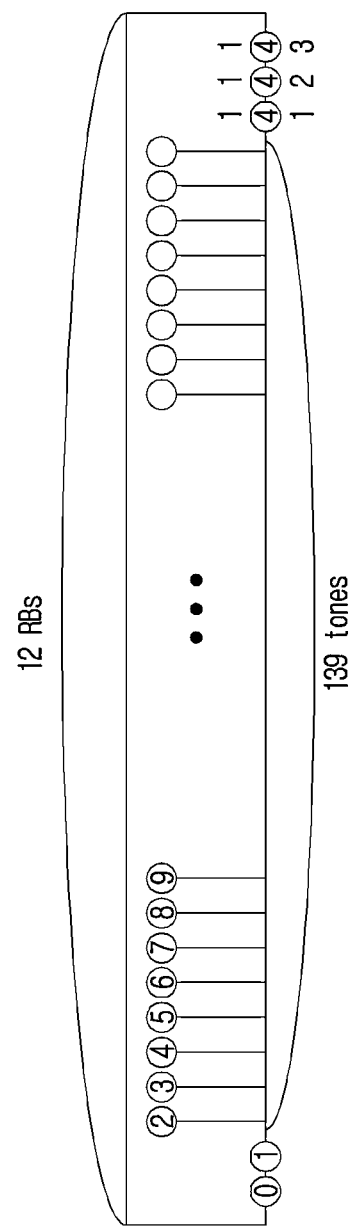
FIG. 10 illustrates an example in which a PRACH preamble is mapped in a frequency domain.

FIG. 10 illustrates an example in which a PRACH preamble is mapped in a frequency domain.

As shown in FIG. 10, a RACH may be transmitted on 139 tones among 12 RBs (144 REs). In FIG. 10, 2 null tones are assumed for the lower RE index and 3 null tones for the upper RE index, but the locations may be changed.

The above-described short PRACH format may be configured with values defined in Table 6 below. Here, the p value is defined as one of {0, 1, 2, 3} according to an SCS value. For example, in the case of 15 kHz SCS as an example, p is 0, and in the case of 30 kHz SCS, p is 1.

Table 8 illustrates preamble formats for $L_{RA}=139$ and $\Delta f_{RA}=15\times 2^\mu$ kHz. In Table 8, $\mu \in \{0, 1, 2, 3\}$, and $\kappa = T_s/T_c = 64$.

TABLE 8

| Format | $L_{RA}$ | $\Delta F_{RA}$ | $N_U$ | $N_{CP}^{RA}$ |
|---|---|---|---|---|
| A1 | 139 | $15 \times 2^\mu$ KHz | $2 \times 2048 \kappa \times 2^{-\mu}$ | $288 \kappa \times 2^{-\mu}$ |
| A2 | 139 | $15 \times 2^\mu$ KHz | $4 \times 2048 \kappa \times 2^{-\mu}$ | $576 \kappa \times 2^{-\mu}$ |
| A3 | 139 | $15 \times 2^\mu$ KHz | $6 \times 2048 \kappa \times 2^{-\mu}$ | $864 \kappa \times 2^{-\mu}$ |
| B1 | 139 | $15 \times 2^\mu$ KHz | $2 \times 2048 \kappa \times 2^{-\mu}$ | $216 \kappa \times 2^{-\mu}$ |
| B2 | 139 | $15 \times 2^\mu$ KHz | $4 \times 2048 \kappa \times 2^{-\mu}$ | $360 \kappa \times 2^{-\mu}$ |
| B3 | 139 | $15 \times 2^\mu$ KHz | $6 \times 2048 \kappa \times 2^{-\mu}$ | $504 \kappa \times 2^{-\mu}$ |
| B4 | 139 | $15 \times 2^\mu$ KHz | $12 \times 2048 \kappa \times 2^{-\mu}$ | $936 \kappa \times 2^{-\mu}$ |
| C0 | 139 | $15 \times 2^\mu$ KHz | $2048 \kappa \times 2^{-\mu}$ | $1240 \kappa \times 2^{-\mu}$ |
| C2 | 139 | $15 \times 2^\mu$ KHz | $4 \times 2048 \kappa \times 2^{-\mu}$ | $2048 \kappa \times 2^{-\mu}$ |

A base station may inform which PRACH format can be transmitted for a specific duration at a specific timing and how many ROs (RACH occasions or PRACH occasions) are present in a corresponding slot through higher layer signaling (RRC signaling or MAC CE or DCI, etc.) (e.g., prach-ConfigurationIndex or msgA-PRACH-ConfigurationIndex). Tables for random access configurations are defined in TS 38.211, and a PRACH transmission time domain resource may be determined according to the PRACH configuration index indicated by higher layer signaling.

Table 9 illustrates a part of a table for random access configurations.

TABLE 9

| PRACH configuration index | Preamble format | $N_f$ mod $x = y$ | | Slot number | Staring symbol | Number of PRACH slots in a 60 kHz slot | $N_t^{RA,slot}$ Number of time domain PRACH occasions (ROs) in a PRACH slot | $N_{dur}^{RA}$, PRACH duration |
|---|---|---|---|---|---|---|---|---|
| | | x | y | | | | | |
| 81 | A1 | 1 | 0 | 4, 9 | 0 | 1 | 6 | 2 |
| 82 | A1 | 1 | 0 | 7, 9 | 7 | 1 | 3 | 2 |
| 100 | A2 | 1 | 0 | 9 | 9 | 1 | 1 | 4 |

TABLE 9-continued

| PRACH configuration index | Preamble format | $N_f$ mod $x = y$ | | Slot number | Staring symbol | Number of PRACH slots in a 60 kHz slot | $N_t^{RA,slot}$ Number of time domain PRACH occasions (ROs) in a PRACH slot | $N_{dur}^{RA}$, PRACH duration |
|---|---|---|---|---|---|---|---|---|
| | | x | y | | | | | |
| 101 | A2 | 1 | 0 | 9 | 0 | 1 | 3 | 4 |
| 127 | A3 | 1 | 0 | 4, 9 | 0 | 1 | 2 | 6 |
| 128 | A3 | 1 | 0 | 7, 9 | 7 | 1 | 1 | 6 |
| 142 | B1 | 1 | 0 | 4, 9 | 2 | 1 | 6 | 2 |
| 143 | B1 | 1 | 0 | 7, 9 | 8 | 1 | 3 | 2 |
| 221 | A1/B1 | 1 | 0 | 4, 9 | 2 | 1 | 6 | 2 |
| 222 | A1/B1 | 1 | 0 | 7, 9 | 8 | 1 | 3 | 2 |
| 235 | A2/B2 | 1 | 0 | 4, 9 | 0 | 1 | 3 | 4 |
| 236 | A2/B2 | 1 | 0 | 7, 9 | 6 | 1 | 2 | 4 |
| 251 | A3/B3 | 1 | 0 | 4, 9 | 0 | 1 | 2 | 6 |
| 252 | A3/B3 | 1 | 0 | 7, 9 | 2 | 1 | 2 | 6 |

Referring to Table 9, how many ROs are defined in a RACH slot for each preamble format ($N_t^{RA-slot}$ the number of time domain PRACH occasions in a PRACH slot), and how many OFDM symbols are occupied by a PRACH preamble of each preamble format ($N_{dur}^{RA}$ PRACH duration) can be known. In addition, since a starting symbol of the first RO may be indicated for each preamble format, information indicating at what time an RO starts in a corresponding RACH slot may also be informed to a UE.

FIG. 11 shows a configuration of an RO in a RACH slot according to a PRACH configuration index value illustrated in Table 9.

FIG. 11 illustrates a configuration of a RACH occasion in one RACH slot.

Method for Performing Random Access Procedure
PUCCH: Physical Uplink Control channel
PUSCH: Physical Uplink Shared Channel
MCCH: Multicast Control Channel
MTCH: Multicast Traffic Channel
RRM: Radio resource management
RLM: Radio link monitoring
SCS: Sub-carrier spacing
RLM: Radio link monitoring
DCI: Downlink Control Information
CAP: Channel Access Procedure
Ucell: Unlicensed cell
PCell: Primary Cell
PSCell: Primary SCG Cell
TBS: Transport Block Size
TDRA: Time Domain Resource Allocation
SLIV: Starting and Length Indicator Value (An indication value for a starting symbol index and the number of symbols in a slot of a PDSCH and/or a PUSCH. It may be configured as a component of an entry constituting a TDRA field in a PDCCH that schedules a corresponding PDSCH and/or PUSCH.)
BWP: BandWidth Part (It may be composed of continuous resource blocks (RBs) on a frequency axis. It may correspond to one numerology (e.g., SCS, CP length, slot/mini-slot duration, etc.). In addition, a plurality of BWPs may be configured in one carrier (the number of BWPs per carrier may also be limited), but the number of activated BWPs may be limited to a part (e.g., one) per carrier.)
CORESET: control resource set (CONtrol REsourse SET) (It means a time-frequency resource region in which a PDCCH can be transmitted, and the number of CORESETs per BWP may be limited.)
REG: Resource element group
SFI: Slot Format Indicator (An indicator indicating a symbol level DL/UL direction within a specific slot(s), transmitted through a group common PDCCH).
COT: Channel occupancy time
SPS: Semi-persistent scheduling
QCL: Quasi-Co-Location (A QCL relationship between two reference signals (RS) may mean that a QCL parameter obtained from one RS such as a Doppler shift, a Doppler spread, an average delay, a delay spread, a spatial Rx parameter, etc. can also be applied to another RS (or antenna port(s) of a corresponding RS). In the NR system, 4 QCL types are defined as follows. 'typeA': {Doppler shift, Doppler spread, average delay, delay spread}, 'typeB': {Doppler shift, Doppler spread}, 'typeC': {Doppler shift, average delay}, 'typeD': {Spatial Rx parameter}. For certain DL RS antenna port(s), a first DL RS may be configured as a reference for QCL type X (X=A, B, C, or D), and a second DL RS may be configured as a reference for QCL type Y (Y=A, B, C, or D, but X≠Y).)
TCI: Transmission Configuration Indication (One TCI state includes a QCL relationship between DM-RS ports of a PDSCH, DM-RS ports of a PDCCH, or CSI-RS port(s) of a CSI-RS resource and one or more DL RSs. For 'Transmission Configuration Indication' among fields in DCI that schedules a PDSCH, a TCI state index corresponding to each code point constituting the field is activated by a MAC control element (CE), and a TCI state configuration for each TCI state index is configured through RRC signaling. In the Rel-16 NR system, a corresponding TCI state is configured between DL RSs, but a configuration between a DL RS and a UL RS or between a UL RS and a UL RS may be allowed in a future release. Examples of a UL RS include an SRS, a PUSCH DM-RS, and a PUCCH DM-RS.)
SRI: SRS resource indicator (It indicates one of SRS resource index values configured in 'SRS resource indicator' among fields in DCI scheduling a PUSCH. When transmitting a PUSCH, a UE may transmit the PUSCH using the same spatial domain transmission filter used for transmission and reception of a reference signal associated with the corresponding SRS resource. Here, a reference RS is configured by RRC signaling through an SRS spatial relation information parameter (SRS-SpatialRelationInfo) for each SRS resource, and an SS/PBCH block, a CSI-RS, or an SRS may be configured as the reference RS.)

TRP: Transmission and Reception Point

PLMN ID: Public Land Mobile Network identifier

RACH: Random Access Channel

RAR: Random Access Response

Msg3: This is a message transmitted through an uplink shared channel (UL-SCH) including a C-RNTI MAC CE or a common control channel (CCCH) service data unit (SDU), provided from a higher layer, and associated with a UE Contention Resolution Identity as part of a random access procedure.

Special Cell: In case of a dual connectivity operation, the term special cell refers to the PCell of a master cell group (MCG) or the PSCell of a secondary cell group (SCG) depending on whether a MAC entity is related to the MCG or the SCG, respectively. Otherwise, the term Special Cell refers to the PCell. The Special Cell supports PUCCH transmission and contention-based random access and is always active.

Serving Cell: It includes the PCell, the PSCell, and the secondary cell (SCell).

The above contents (3GPP system, frame structure, NR system, etc.) can be applied in combination with the methods proposed in the present disclosure to be described later, or supplemented to clarify the technical characteristics of the methods proposed in the present disclosure. In this disclosure, '/' means 'and', 'or', or 'and/or' depending on the context.

In order to access a cell, a UE generally needs to support a predetermined UE capability. For example, to access a cell of the LTE system, a UE should be able to receive system information (i.e., a master information block (MIB) and a system information block (SIB)) broadcast by a base station for a corresponding cell. Various types of SIB types are defined. Since an SIB can be transmitted through a plurality of physical resource blocks (PRBs), a UE accessing an LTE cell should have an ability to receive at least 20 Mhz bandwidth.

In order to access an NR cell, first, a UE should be able to necessarily receive an MIB through an SSB/PBCH transmitted through an initial DL BWP. And, even if an SSB/PBCH can be received, a UE should check whether the corresponding cell is accessible according to cell access information included in SIB1.

To this end, a UE may check whether a control resource set (CORESET) exists for a Type0-PDCCH common search space based on an MIB. When a Type0-PDCCH common search space exists, a UE determines CORSET #0 and a PDCCH occasion based on information in an MIB (e.g., pdcch-ConfigSIB1), and receives SIB1 through a PDSCH indicated by a PDCCH received at a corresponding PDCCH occasion.

A UE receiving an SIB needs to check various information to determine whether it can access the corresponding cell, and If some information does not satisfy a condition, a UE configures a corresponding cell as an access-prohibited cell. For example, a maximum uplink channel bandwidth supported by a UE should be greater than or equal to a bandwidth of an initial UL BWP, and a maximum downlink channel bandwidth supported by a UE should be greater than or equal to an initial DL BWP bandwidth. If this is not satisfied, the corresponding cell is configured as an access-prohibited cell.

Meanwhile, in REL-17 NR, a new type of UE with reduced capability is planned to be supported. Such a UE may be referred to as an R-terminal or an R-UE (or redcap terminal, redcap UE) different from the existing REL-15 UE.

Since an R-UE supports limited UE capability than an existing UE, a problem may occur in a cell access process. For example, an R-UE may not be able to receive an MIB through an initial DL BWP of an existing NR cell. Also, even if an MIB can be received, an R-UE may not be able to receive a PDCCH scheduling CORESET #0 or SIB1. Alternatively, an R-UE may have a maximum uplink channel bandwidth or a maximum downlink bandwidth greater than or equal to an initial BWP bandwidth supported by an existing NR cell. Alternatively, a problem of not receiving a paging message transmitted by a base station or not performing uplink RACH transmission for initial access may occur due to numerology (e.g., SCS) supported by an initial BWP of an existing cell. Due to these problems, a problem in which a general NR cell is configured as an access-prohibited cell may occur frequently in an R-UE.

Meanwhile, since an R-UE supports limited UE capability than an existing UE, a base station may want to delay access in a RACH process. However, in the prior art, there is a problem in that a base station cannot selectively delay a RACH process only for an R-UE. For example, according to the prior art, when RACH transmission fails (i.e., random access procedure fails) and backoff is performed, a normal UE and an R-UE may delay RACH transmission by the same backoff value. However, since the number of accessing normal UEs and the number of R-UEs may be different, this method may be disadvantageous to a UE type with a small number (e.g., R-UE).

Meanwhile, required UE capabilities may be different for each network slicing (network architecture that enables multiplexing of virtualized independent logical networks in the same physical network) (e.g., V2X dedicated network, network used in smart factory, sensor network, etc.) supported by the 5G core network. That is, UE capabilities capable of accessing a specific type of slice may be differently defined.

A UE of the present disclosure (referred to as a specific type of UE) may support only one feature among various functions or support some of various functions in a feature combination. Various functions may include a limited bandwidth support function, a limited number of RXs (e.g., 1 RX or 2 RXs), a specific type of slice access function, a coverage enhancement function, etc.

In the present disclosure, for convenience of description, an R-UE is mainly described, but the present disclosure is not limited thereto, and the present disclosure may also be applied to a 'specific type of UE' supporting only reduced functions or special functions in comparison to a normal UE. In addition, these specific types of UEs may be classified into various types of UEs according to various capabilities or combinations of capabilities as described above.

In other words, in the present disclosure, a function/capability supported by a UE may be differently defined for each type of UE, and these UEs are collectively referred to as a specific type of UE. Therefore, even if there is no separate mention in the following description, an R-UE may be replaced with a special type of UE.

As described above, a case in which an R-UE cannot receive an existing SIB1 transmission may occur. Alternatively, a case in which an existing SIB1 does not correspond to an R-UE (e.g., a case in which it is not applicable to an R-UE, etc.) may occur. Alternatively, a case may occur in which an R-UE needs to receive additional R-UE dedicated information in addition to the existing SIB1 information. Therefore, according to the present disclosure, an R-UE may receive new SIB1 different from the existing SIB1. As such, in the present disclosure, a separate SIB1 that can be received by an R-UE (i.e., SIB1 dedicated to an R-UE) is referred to as R-SIB1 for convenience.

R-SIB1 may include all or part of configuration information included in existing SIB1, and/or may also include configuration information dedicated to R-UE. Here, a legacy UE may not receive R-SIB1. That is, a legacy UE may receive the existing SIB1, and an R-UE may receive R-SIB1. However, when R-SIB1 is not provided, an R-UE may receive the existing SIB1. At this time, an R-UE may also receive additional transmission of the existing SIB1 transmission for coverage enhancement. That is, an R-UE may receive both the existing SIB1 and R-SIB1 as well.

In this case, from the point of view of a base station, it is necessary to simultaneously operate two types of SIB1, that is, SIB1 and R-SIB1, in one cell. In this case, one type of MIB may be mapped to both types of SIB1. For example, an MIB may include information/parameters related to existing SIB1 reception and information/parameters related to R-SIB1 reception. Alternatively, the existing MIB may be mapped to the existing SIB1, and the existing SIB1 may be mapped to R-SIB1 for operation. For example, the existing MIB may include information/parameters related to existing SIB1 reception, and SIB1 may include information/parameters related to R-SIB1 reception.

The existing SIB1 and R-SIB1 may include scheduling information (e.g., schedulingInfoList) indicating whether other SIBs are broadcast and transmission intervals of other SIBs and RACH-ConfigCommon.

Here, a base station may configure an indicator indicating whether a scaling factor (scalingFactorBI) of a back-off indicator (BI) is applied to an R-UE to be included in configuration information (e.g. RACH-ConfigCommon or RACH-ConfigCommonTwoStepRA) for configuring parameters for a cell-specific 4-step or 2-step random access procedure or configuration information (e.g. RACH-ConfigDedicated) for configuring UE-specific random access parameters or SIB1.

Table 10 illustrates RACH-ConfigCommon for a normal UE and an R-UE.

TABLE 10

```
RACH-ConfigCommon ::= SEQUENCE {
rach-ConfigGeneric RACH-ConfigGeneric,
totalNumberOfRA-Preambles INTEGER (1..63) OPTIONAL, -- Need S
ssb-perRACH-OccasionAndCB-PreamblesPerSSB CHOICE {
oneEighth ENUMERATED {n4,n8,n12,n16,n20,n24,n28,n32,n36,n40,n44,n48,n52,n56,n60,n64},
oneFourth ENUMERATED {n4,n8,n12,n16,n20,n24,n28,n32,n36,n40,n44,n48,n52,n56,n60,n64},
oneHalf ENUMERATED {n4,n8,n12,n16,n20,n24,n28,n32,n36,n40,n44,n48,n52,n56,n60,n64},
one ENUMERATED {n4,n8,n12,n16,n20,n24,n28,n32,n36,n40,n44,n48,n52,n56,n60,n64},
two ENUMERATED {n4,n8,n12,n16,n20,n24,n28,n32},
four INTEGER (1..16),
eight INTEGER (1..8),
sixteen INTEGER (1..4)
} OPTIONAL, -- Need M
groupBconfigured SEQUENCE {
ra-Msg3SizeGroupA ENUMERATED {b56, b144, b208, b256, b282, b480, b640,
b800, b1000, b72, spare6, spare5, spare4, spare3, spare2, spare1},
messagePowerOffsetGroupB ENUMERATED { minusinfinity, dB0, dB5, dB8, dB10, dB12, dB15,
dB18},
numberOfRA-PreamblesGroupA INTEGER (1..64)
} OPTIONAL, -- Need R
ra-ContentionResolutionTimer ENUMERATED { sf8, sf16, sf24, sf32, sf40, sf48, sf56, sf64},
rsrp-ThresholdSSB RSRP-Range OPTIONAL, -- Need R
rsrp-ThresholdSSB-SUL RSRP-Range OPTIONAL, -- Cond SUL
prach-Root Sequence Index CHOICE {
1839 INTEGER (0..837),
1139 INTEGER (0..137)
},
msg1-SubcarrierSpacing SubcarrierSpacing OPTIONAL, -- Cond L139
restrictedSetConfig ENUMERATED {unrestrictedSet, restrictedSetTypeA, restrictedSetTypeB},
msg3-transformPrecoder ENUMERATED {enabled} OPTIONAL, -- Need R
...,
[[
ra-PrioritizationForAccessIdentity-r16 SEQUENCE {
ra-Prioritization-r16 RA-Prioritization,
ra-PrioritizationForAI-r16 BIT STRING (SIZE (2))
} OPTIONAL, -- Cond InitialBWP-Only
prach-Root Sequence Index-r16 CHOICE {
1571 INTEGER (0..569),
11151 INTEGER (0..1149)
} OPTIONAL -- Need R
]]
}
RA-Prioritization ::= SEQUENCE {
powerRampingStepHighPriority ENUMERATED {dB0, dB2, dB4, dB6},
scalingFactorBI ENUMERATED {zero, dot25, dot5, dot75} OPTIONAL, -- Need R
}
RACH-ConfigGeneric ::= SEQUENCE {
prach-ConfigurationIndex INTEGER (0..255),
msg1-FDM ENUMERATED {one, two, four, eight},
```

TABLE 10-continued

```
msg1-FrequencyStart INTEGER (0..maxNrofPhysicalResourceBlocks-1),
zeroCorrelationZoneConfig INTEGER (0..15),
preambleReceivedTargetPower INTEGER (-202..-60),
preambleTransMax ENUMERATED {n3, n4, n5, n6, n7, n8, n10, n20, n50, n100, n200},
powerRampingStep ENUMERATED {dB0, dB2, dB4, dB6},
ra-ResponseWindow ENUMERATED {sl1, sl2, sl4, sl8, sl10, sl20, sl40, sl80},
...,
[ [
prach-ConfigurationPeriodScaling-IAB-r16 ENUMERATED {scf1,scf2,scf4,scf8,scf16,scf32,scf64}
OPTIONAL, -- Need R
prach-ConfigurationFrameOffset-IAB-r16 INTEGER (0..63) OPTIONAL, -- Need R
prach-ConfigurationSOffset-IAB-r16 INTEGER (0..39) OPTIONAL, -- Need R
ra-ResponseWindow-v1610 ENUMERATED { s160, s1160} OPTIONAL, -- Need R
prach-ConfigurationIndex-v1610 INTEGER (256..262) OPTIONAL -- Need R
] ]
}
```

Referring to Table 10, a scaling factor (scalingFactorBI) of BIs in RACH-ConfigCommon for a normal UE and an R-UE may be included and transmitted, for example, the values may be 0 (zero), 0.25 (dot25), 0.5 (dot5), and 0.75 (dot75). Here, a scaling factor (scalingFactorBI) value of a BI illustrated in Table 10 is an example, and the present disclosure is not limited thereto. Also, as described above, a scaling factor (scalingFactorBI) of a BI may be included in configuration information for parameters of a 2-step random access type or configuration information for UE-specific random access parameter.

Meanwhile, a base station may restrict R-UEs to use only some PRACH resources among the following PRACH resources configured for normal UEs. For example, among RACH slots configured for normal UEs, R-UEs may restrict use of only some RACH slots. Alternatively, among system frame numbers (SFNs) for a PRACH, R-UEs may transmit PRACHs only in some SFNs.

Figure 12:
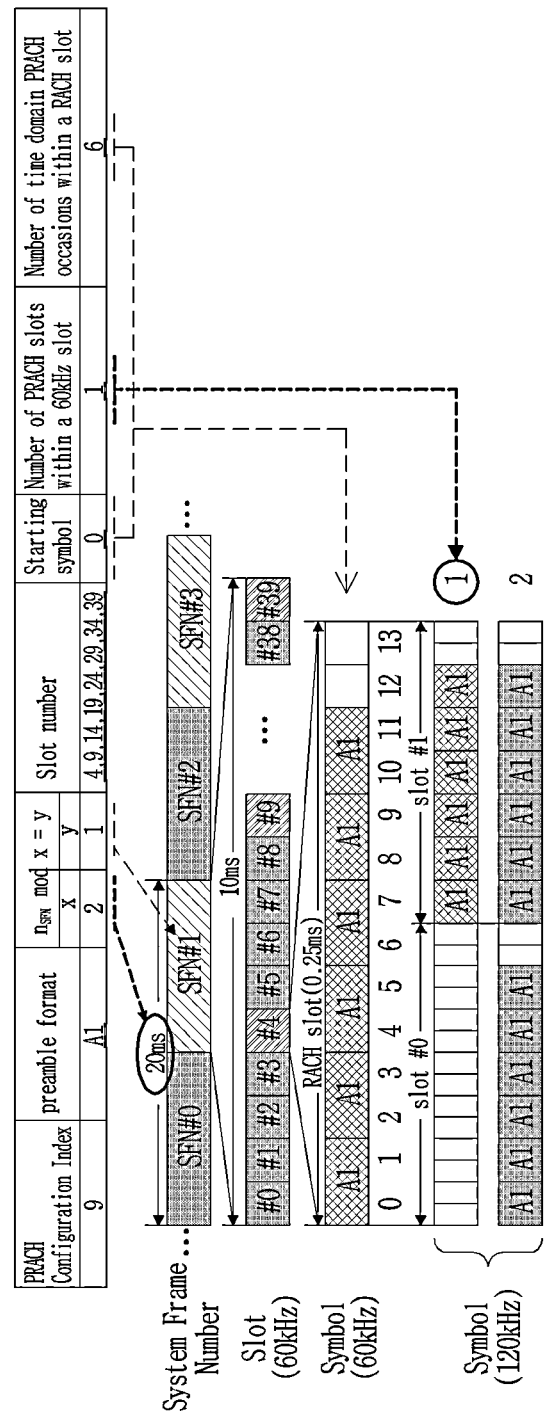
FIG. 12 illustrates a RACH configuration according to one embodiment of the present disclosure.

FIG. 12 illustrates a RACH configuration according to one embodiment of the present disclosure.

FIG. 12 illustrates PRACH resources when a physical random access channel (PRACH) configuration index is 9. Since x=2 and y=1 in nSFN mod x=y, PRACH resources can be configured in frames with odd frame indexes. In addition, since a starting symbol is 0, PRACH resources start from the 0th symbol in slots having slot numbers 4,9,14,19,24,29,34, 39 in the corresponding frames, and since the number of time domain PRACH occasions within a RACH slot is 6, 6 PRACH resources can be configured. In the case of a slot where SCS of a corresponding cell (or BWP) is 60 kHz, depending on the number of PRACH slots within a 60 kHz slot is 1 or 2, PRACH slots in which PRACH resources are configured may be configured differently.

Among the PRACH resources configured as shown in FIG. 12, an R-UE may be restricted to configure PRACH resources only in a specific frame (i.e., SFN) and/or a specific slot. A rule or a specific value for determining a specific frame (i.e., SFN) and/or a specific slot may be predefined or may be configured by a base station through higher layer signaling (e.g., RRC signaling).

After selecting a cell, an R-UE may receive SIB1 and/or R-SIB1. A UE may receive RACH configuration information (e.g., RACH-ConfigCommon) through these SIBs. Here, according to configuration of a base station, an R-UE may be configured to transmit a PRACH only in random access preamble identifiers (RAPIDs) indicated by a parameter for a random access preamble start index (e.g., ra-PreambleStartIndex) and/or RACH Occasions (ROs) allowed by a parameter for a PRACH mask index (e.g., ra-ssb-OccasionMaskIndex) for random access resource selection. That is, an R-UE may be configured to perform PRACH transmission only among some RA association periods and ROs among all random access (RA) association periods and ROs of a corresponding cell according to configuration of a base station.

This limited configuration may be configured to be applied only to a cell of a specific band (e.g., 4 Rx band) or RACH to a specific band of a cell. A base station may separately indicate whether an R-UE can use all PRACH resources. In this case, a UE may determine whether to transmit a PRACH among all PRACH resources or among limited partial PRACH resources according to whether or not a separate indication is given. In addition, it can be configured to adjust an amount of PRACH resources used or limited according to a specific capability value of an R-UE. Alternatively, an amount of PRACH resources used or limited may be configured according to a level of an RSRP value of a serving cell measured by an R-UE. For example, the larger an RSRP value of a serving cell measured by an R-UE, the smaller an amount of PRACH resources may be configured.

Since an R-UE may access only a specific RACH slot, a base station may randomize locations of restricted RACH resources (to prevent crowding into a specific RACH slot). For example, RACH slots usable by an R-UE or RACH slots unavailable to an R-UE may be changed according to a result value of SFN mod N (i.e., per frame). That is, the PRACH resource may be configured in a different slot for each frame in which the PRACH resource is configured (or the PRACH slot is configured). For example, if SFN mod N=1, as shown in FIG. 12, an R-UE may be configured with a RACH slot allowed for the R-UE for each C-th RACH slot from initial slot #4 (C=5, C is a natural number), and random access of the R-UE may be not allowed if SFN mod N=2, and if SFN mod N=3, the R-UE may be configured with RACH slots allowed for the R-UE in every C-th RACH slot from initial slot #5. Here, a base station may include an initial slot, an N value, and a C value in system information or higher layer signaling (e.g., RRC signaling) as a RACH configuration for an R-UE. A base station may decrease or increase a C value in order to adjust the number of allocated RACH slots according to a level of an RSRP value measured by a UE. Alternatively, the number of SFNs to which RACH slots are allocated may be increased or decreased according to a level of an RSRP value. Alternatively, the number of PRACH occasions that can be selected by an R-UE within the RACH slot may be increased or decreased according to a level of an RSRP value.

When transmitting a PRACH preamble, an R-UE monitors a PDCCH through an RA window. According to scheduling information of a PDCCH, an R-UE receives PDSCH transmission and receives a Random Access Response (RAR) MAC Control Element (MAC CE) through the corresponding PDSCH. If an RAR MAC CE includes a RACH preamble index (i.e., RAPID) transmitted by an R-UE, the R-UE determines that a RACH process is successful. If an RAR MAC CE does not include a RACH preamble index (i.e., RAPID) transmitted by an R-UE, or if contention resolution is not received after MSG3 transmission, the R-UE transmits a RACH preamble again.

Here, an RAR MAC CE may include a Backoff Indicator (BI) field. If a RACH preamble is retransmitted, a UE backoffs according to a value of a backoff indicator (i.e., waits for a time corresponding to a value indicated by a backoff indicator) and then retransmits a RACH preamble. If a scaling factor of a BI (scalingFactorBI) for an R-UE is received through SIB1 or R-SIB1, the R-UE scales a value of the received Backoff Indicator. Here, scalingFactorBI for an R-UE may be set to a value greater than 1. For example, when scalingFactorBI is 1.5 and a value of a Backoff Indicator field is 100 ms, a R-UE can back off for 150 ms and then transmit a RACH preamble again. As another example, when scalingFactorBI is 3 and a value of a Backoff Indicator field is 200 ms, a R-UE backs off for 600 ms and transmits a RACH preamble again. That is, an R-UE may perform backoff with a value calculated by scalingFactorBI X Backoff Indicator. Here, a backoff may be adjusted and configured to a longer time than that of a normal UE.

Meanwhile, a scaling factor may be configured to different values according to a specific capability value of an R-UE or configured to different values according to a level of an RSRP value of a serving cell measured by an R-UE. In this case, if a UE is defined/configured in various types according to a specific capability value or an R-UE is defined/configured in various types according to a UE capability in configuration information related to a random access procedure (or system information including it), different scaling factors (i.e., multiple scaling factors) may be configured for each type. Alternatively, RSRP threshold information and a plurality of scaling factors accordingly may be configured in configuration information related to a random access procedure (or system information including it).

For example, when an R-UE is defined/configured as R-UE type 1 (i.e., a specific type of R-UE when an R-UE is defined/configured as various types according to UE capabilities) according to the contents of SIB1 or SIB1-R transmitted by a base station, scalingFactorBI=2 may be configured, and if R-UE type2, scalingFactorBI=3.5 may be configured. In addition, different scalingFactorBI may be applied according to an RSRP value measured by an R-UE. That is, it may be defined/configured in various types according to an RSRP value measured by an R-UE. For example, if an RSRP measurement value is greater than or equal to a specific RSRP threshold, an R-UE may perform backoff by setting scalingFactorBI=1.5, and if an RSRP measurement value is less than or equal to a specific RSRP threshold, an R-UE may perform backoff by setting scalingFactorBI=4.5. Alternatively, if an RSRP measurement value is greater than or equal to a specific RSRP threshold, an R-UE may perform backoff without applying scalingFactorBI, and if an RSRP measurement value is less than or equal to a specific RSRP threshold, an R-UE may perform backoff by applying scalingFactorBI. Alternatively, if an RSRP measurement value is greater than or equal to a specific RSRP threshold, an R-UE may not perform backoff, and if an RSRP measurement value is less than or equal to a specific RSRP threshold, an R-UE may perform backoff with or without applying scalingFactorBI. For such RSRP measurement, backoff may be performed based on a result measured immediately before a RACH or may be performed based on RSRP measurement measured during a RACH process. Here, an RSRP is a L1-RSRP or a L3-RSRP.

Meanwhile, a scaling factor may not be applied to normal UEs other than R-UEs. Even in the case of an R-UE, only when a base station includes scalingFactorBI for R-UEs in system information of a specific cell, R-UEs accessing the cell can apply it. That is, when scalingFactorBI is not included in system information, an R-UE may calculate a backoff time like a normal UE. In addition, when scalingFactorBI is not included in system information, an R-UE may determine/consider that a scalingFactorBI value is set to a default value. For example, a default value of scalingFactorBI can be defined as 1. In addition, if a base station does not include a Backoff Indicator field in an RAR MAC CE, since an R-UE does not apply backoff itself in a RACH process, scalingFactorBI may also not be applied.

Meanwhile, in the above methods, R-UEs may not mean all types of R-UEs. For example, a base station may apply scalingFactorBI or configure to use limited PRACH resources only for R-UEs having 1 RX capability (i.e., only R-UEs of a specific type) through system information. Therefore, an R-UE having 2 RX capabilities may not apply scalingFactorBI like a normal UE or may be configured to use all PRACH resources.

In addition, this scalingFactorBI configuration can be configured to be applied only to a cell of a specific band (e.g., 4 Rx bands) or a RACH to a specific band of a cell. For example, an R-UE having 1 RX capability may be configured to apply scalingFactorBI only to an NR 4 Rx band or to use limited PRACH resources. Therefore, when a carrier of a serving cell is not an NR 4 Rx band, an R-UE having 1 RX capability may not apply scalingFactorBI or may be configured to use all PRACH resources like a normal UE. Alternatively, an R-UE having 1 RX capability may consider a corresponding cell as barred according to system information in an NR 4 Rx band, applies scalingFactorBI only in an NR 2 Rx band, or may be configured to use limited PRACH resources.

As described above, since the number of normal UEs and the number of R-UEs accessing the same cell may be different, a scaling factor may be configured differently according to a UE type (e.g., R-UE), and cell congestion may be controlled accordingly.

Figure 13:
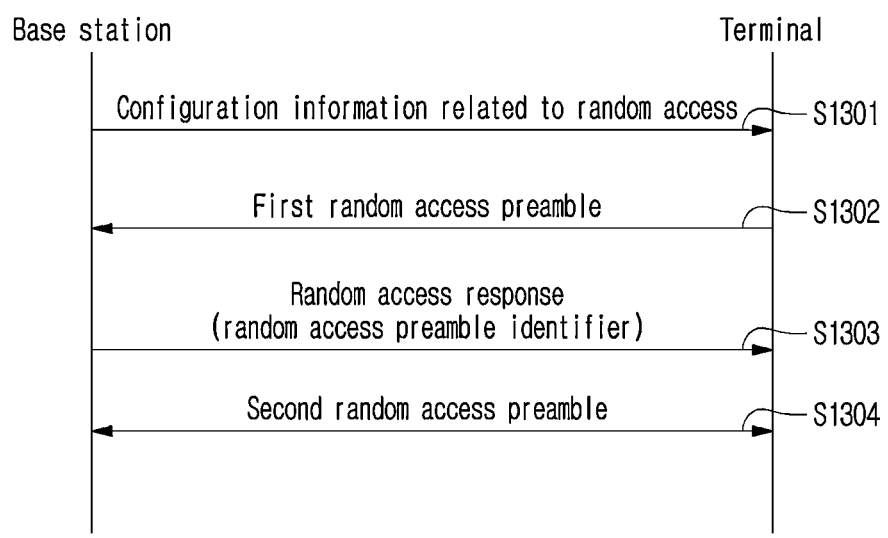
FIG. 13 is a diagram illustrating a signaling procedure between a base station and a terminal for performing a random access procedure according to an embodiment of the present disclosure.

FIG. 13 is a diagram illustrating a signaling procedure between a base station and a terminal for performing a random access procedure according to an embodiment of the present disclosure.

FIG. 13 illustrates a signaling procedure between a user equipment (UE) and a base station (BS) based on the method proposed above. The example of FIG. 13 is for convenience of description and does not limit the scope of the present disclosure. Some step(s) illustrated in FIG. 13 may be omitted depending on circumstances and/or settings. In addition, the base station and the UE in FIG. 13 are just one example and may be implemented as a device illustrated in FIG. 16 below. For example, the processor 102/202 of FIG. 16 may control to transmit and receive channels/signals/data/information, etc. using the transceiver 106/206 and to store transmitted or received channels/signals/data/information in the memory 104/204.

In addition, in the operation between the base station and the terminal of FIG. 13, the above-described contents may be referenced/used even if there is no separate mention.

A base station may be a general term for objects that transmit and receive data to and from a terminal. For example, the base station may be a concept including one or more transmission points (TPs), one or more transmission and reception points (TRPs), etc. In addition, a TP and/or a TRP may include a panel of a base station, a transmission and reception unit, etc. In addition, "TRP" may be substituted with an expression such as a panel, an antenna array, a cell (e.g., macro cell/small cell/pico cell, etc.), a TP (transmission point), a base station (base station, gNB, etc.) and applied. As described above, TRPs may be classified according to information (e.g., index, ID) on a CORESET group (or CORESET pool). For example, when one UE is configured to transmit and receive multiple TRPs (or cells), this may mean that multiple CORESET groups (or CORESET pools) are configured for one UE. Configuration of such a CORESET group (or CORESET pool) may be performed through higher layer signaling (e.g., RRC signaling, etc.).

Referring to FIG. 13, signaling between one base station and one UE is considered for convenience of description, but the corresponding signaling scheme may be extended and applied to signaling between multiple TRPs and multiple UEs. In the following description, a base station may be interpreted as one TRP. Alternatively, a base station may include a plurality of TRPs, or may be one cell including a plurality of TRPs.

Referring to FIG. 13, a UE receives configuration information related to random access from a base station (S1301).

Here, the configuration information related to random access may be cell-specific configuration information related to random access (e.g., RACH-ConfigCommon or RACH-ConfigCommonTwoStepRA) or may be UE-dedicated configuration information related to random access (e.g., RACH-ConfigDedicated).

The configuration information may be transmitted through higher layer signaling (e.g., RRC signaling).

Specifically, when the configuration information related to random access is cell-specific configuration information related to random access, the configuration information related to random access may be transmitted through system information. In addition, as described above, separate system information may be configured for each of a normal UE and an R-UE (i.e., a specific type of UE), and the configuration information related to random access may be transmitted through system information (e.g., R-SIB1) configured for an R-UE.

In addition, the configuration information related to random access may include a scaling factor for a backoff indicator (BI).

As described above, a UE receiving the configuration information may correspond to a specific type of UE (e.g., R-UE) having a reduced or limited capability compared to a normal UE such as a R-UE supporting a reduced capability compared to an existing UE, a UE capable of access limited to a specific network slice, a UE supporting a special/limited capability based on a feature set, etc.

In addition, this specific type of UE may be defined as a plurality of types according to a capability supported by a UE (e.g., among R-UE, a first type of R-UE, a second type of R-UE, etc.) (another example, a first type of UE corresponding to an R-UE, a second type of UE capable of accessing only to a specific slice). In this case, different scaling factors may be applied to each type of the specific type of UE. In this case, in the configuration information, a scaling factor for a backoff indicator (BI) may be separately configured/indicated for each UE type.

In addition, different scaling factors may be applied according to an RSRP value measured by a UE. For example, different scaling factors may be applied depending on whether an RSRP value is greater than or equal to (or less than) a specific threshold. In this case, an RSRP threshold value and/or scaling factors for a plurality of backoff indicators (BIs) may be configured/indicated in configuration information.

In addition, a PRACH resource may be limitedly configured for the specific type of UE. For example, the PRACH resource may be limitedly configured by a RAPID and/or a PRACH mask index for random access resource selection for the specific type of UE. In this case, in the configuration information, a value may be indicated/configured only within specific RAPID candidates and/or PRACH mask index candidates for the specific type of UE. In addition, when the specific type of UE is defined as a plurality of types, an RAPID and/or a PRACH mask index may be configured differently (individually) for each type, and different (individual) PRACH resources may be configured/indicated based on an RAPID and/or a PRACH mask index for each UE type by the configuration information.

Alternatively, as described above, an amount (or location) of the PRACH resource may be configured differently for each type of the specific type of UE or according to an RSRP measurement value of a serving cell. For example, the PRACH resource may be configured in different slots for each frame in which the PRACH resource is configured. In this case, the configuration information may include information for configuring a limited PRACH resource for the specific type of UE. In addition, when the specific type of UE is defined as a plurality of types, a PRACH resource may be configured for each type, and information for PRACH resource configuration for each UE type may be individually configured/indicated in the configuration information.

A configuration for the limited scaling factor of a BI and/or a PRACH resource configuration may be configured to be applied only to a cell of a specific band (e.g., 4 Rx band) or a random access procedure to a specific band of a cell.

A UE transmits a first random access preamble to the base station (S1302).

Here, a first random access preamble may be transmitted through a PRACH resource.

As described above, when a UE is a specific type of UE, a first random access preamble may be transmitted through a limited PRACH resource configured by configuration information. For example, through a PRACH resource configured by a RAPID and/or a PRACH mask index for random access resource selection for the specific type of UE, a UE may transmit a first random access preamble.

In addition, when the specific type of UE is defined as a plurality of types, a PRACH resource may be separately configured for each type. Alternatively, when the specific type of Ue is defined as a plurality of types, an amount (or location) of the PRACH resource may be configured differently for each type. In this case, a UE may transmit a first random access preamble through a PRACH resource corresponding to its own type.

In addition, an amount (or location) of the PRACH resource may be configured differently according to an RSRP measurement value of a serving cell of a UE, the UE may determine a PRACH resource based on the measured RSRP value and transmit a first random access preamble in the determined PRACH resource.

In addition, only when the UE initiates (performs) a random access procedure to a cell of a specific band (e.g., 4

Rx band) or a specific band of a cell, the UE may transmit a first random access preamble in a PRACH resource according to the limited PRACH resource configuration.

A UE receives a random access response (RAR) as a response to a first random access preamble from a base station (S1303).

Here, a random access response (RAR) may correspond to an RAR MAC CE and may be transmitted through a PDSCH.

The RAR includes a backoff indicator (BI). A UE may store a BI value included in the RAR.

In addition, a random access response (RAR) also includes a random access preamble identifier (RAPID). Upon receiving the RAR, a UE checks whether a RAPID for (and associated with) a first random access preamble transmitted by the UE in an RAR is identified. In other words, a UE receiving an RAR checks whether a RAPID included in an RAR matches (includes) a RAPID for (and associated with) a first random access preamble transmitted by the UE.

If the RAR does not include the RAPID associated with the first random access preamble (if not identified), a UE transmits a second random access preamble to a base station (S1340).

That is, a UE starts a new random access procedure.

Here, a UE may transmit a second random access preamble after a back-off time indicated by a BI in an RAR (i.e., after performing back-off with a value indicated by a BI).

Specifically, when the UE is a specific type of UE, the UE may perform transmission after a back-off time in which a scaling factor for a BI indicated in configuration information is applied to a BI in the RAR (i.e., after determining a back-off time by applying a scaling factor to a value indicated by a BI, and performing back-off as much as the determined back-off time). For example, after a time when a scaling factor is multiplied by a value indicated by a BI, the UE may transmit a second random access preamble.

As described above, different scaling factors may be applied to each type of the specific type of UE. In this case, in the configuration information, a scaling factor for a BI for each type of UE may be configured/indicated separately, a UE may determine a backoff time by applying a scaling factor corresponding to its type to a BI of an RAR.

In addition, different scaling factors may be applied according to an RSRP value measured by a UE. For example, different scaling factors may be applied depending on whether an RSRP value is greater than or equal to (or less than) a specific threshold. In this case, an RSRP threshold value and/or scaling factors for a plurality of BIs may be configured/indicated in configuration information. In this case, a UE may determine a scaling factor based on the measured RSRP value and apply the determined scaling factor to a BI of an RAR to determine a backoff time.

In addition, only when the UE initiates (performs) a random access procedure to a cell of a specific band (e.g., 4 Rx band) or a specific band of a cell, the UE may perform backoff during a backoff time derived by applying a scaling factor for a BI and transmit the second random access preamble.

Meanwhile, if an RAPID included in an RAR matches (includes) aa RAPID for (and associated with) a first random access preamble that it has transmitted, a UE may transmit UL-SCH (Shared Channel) data (message 3) through a PUSCH according to UL scheduling information and a timing offset value in an RAR and perform a subsequent random access procedure.

Figure 14:
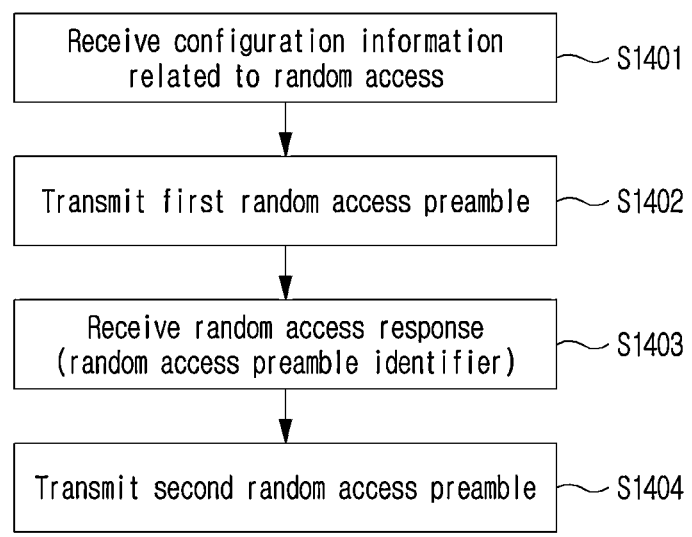
FIG. 14 is a diagram illustrating operations of a terminal for a method for performing a random access procedure according to an embodiment of the present disclosure.

FIG. 14 is a diagram illustrating operations of a terminal for a method for performing a random access procedure according to an embodiment of the present disclosure.

FIG. 14 illustrates an operation of a UE based on the method proposed above. The example of FIG. 14 is for convenience of description and does not limit the scope of the present disclosure. Some step(s) illustrated in FIG. 14 may be omitted depending on circumstances and/or settings. In addition, the UE in FIG. 14 is just one example and may be implemented as a device illustrated in FIG. 16 below. For example, the processor 102/202 of FIG. 16 may control to transmit and receive channels/signals/data/information, etc. (e.g., RRC signaling, MAC CE, DCI for UL/DL scheduling, SRS, PDCCH, PDSCH, PUSCH, PUCCH, PHICH, etc.) using the transceiver 106/206 and to store transmitted or received channels/signals/data/information in the memory 104/204.

Referring to FIG. 14, a UE receives configuration information related to random access from a base station (S1401).

Here, the configuration information related to random access may be cell-specific configuration information related to random access (e.g., RACH-ConfigCommon or RACH-ConfigCommonTwoStepRA) or may be UE-dedicated configuration information related to random access (e.g., RACH-ConfigDedicated).

The configuration information may be transmitted through higher layer signaling (e.g., RRC signaling).

Specifically, when the configuration information related to random access is cell-specific configuration information related to random access, the configuration information related to random access may be transmitted through system information. In addition, as described above, separate system information may be configured for each of a normal UE and an R-UE (i.e., a specific type of UE), and the configuration information related to random access may be transmitted through system information (e.g., R-SIB1) configured for an R-UE.

In addition, the configuration information related to random access may include a scaling factor for a backoff indicator (BI).

As described above, a UE receiving the configuration information may correspond to a specific type of UE (e.g., R-UE) having a reduced or limited capability compared to a normal UE such as a R-UE supporting a reduced capability compared to an existing UE, a UE capable of access limited to a specific network slice, a UE supporting a special/limited capability based on a feature set, etc.

In addition, this specific type of UE may be defined as a plurality of types according to a capability supported by a UE (e.g., among R-UE, a first type of R-UE, a second type of R-UE, etc.) (another example, a first type of UE corresponding to an R-UE, a second type of UE capable of accessing only to a specific slice). In this case, different scaling factors may be applied to each type of the specific type of UE. In this case, in the configuration information, a scaling factor for a backoff indicator (BI) may be separately configured/indicated for each UE type.

In addition, different scaling factors may be applied according to an RSRP value measured by a UE. For example, different scaling factors may be applied depending on whether an RSRP value is greater than or equal to (or less than) a specific threshold. In this case, an RSRP threshold value and/or scaling factors for a plurality of backoff indicators (BIs) may be configured/indicated in configuration information.

In addition, a PRACH resource may be limitedly configured for the specific type of UE. For example, the PRACH resource may be limitedly configured by a RAPID and/or a PRACH mask index for random access resource selection for the specific type of UE. In this case, in the configuration information, a value may be indicated/configured only within specific RAPID candidates and/or PRACH mask index candidates for the specific type of UE. In addition, when the specific type of UE is defined as a plurality of types, an RAPID and/or a PRACH mask index may be configured differently (individually) for each type, and different (individual) PRACH resources may be configured/indicated based on an RAPID and/or a PRACH mask index for each UE type by the configuration information.

Alternatively, as described above, an amount (or location) of the PRACH resource may be configured differently for each type of the specific type of UE or according to an RSRP measurement value of a serving cell. For example, the PRACH resource may be configured in different slots for each frame in which the PRACH resource is configured. In this case, the configuration information may include information for configuring a limited PRACH resource for the specific type of UE. In addition, when the specific type of UE is defined as a plurality of types, a PRACH resource may be configured for each type, and information for PRACH resource configuration for each UE type may be individually configured/indicated in the configuration information.

A configuration for the limited scaling factor of a BI and/or a PRACH resource configuration may be configured to be applied only to a cell of a specific band (e.g., 4 Rx band) or a random access procedure to a specific band of a cell.

A UE transmits a first random access preamble to the base station (S1402).

Here, a first random access preamble may be transmitted through a PRACH resource.

As described above, when a UE is a specific type of UE, a first random access preamble may be transmitted through a limited PRACH resource configured by configuration information. For example, through a PRACH resource configured by a RAPID and/or a PRACH mask index for random access resource selection for the specific type of UE, a UE may transmit a first random access preamble.

In addition, when the specific type of UE is defined as a plurality of types, a PRACH resource may be separately configured for each type. Alternatively, when the specific type of Ue is defined as a plurality of types, an amount (or location) of the PRACH resource may be configured differently for each type. In this case, a UE may transmit a first random access preamble through a PRACH resource corresponding to its own type.

In addition, an amount (or location) of the PRACH resource may be configured differently according to an RSRP measurement value of a serving cell of a UE, the UE may determine a PRACH resource based on the measured RSRP value and transmit a first random access preamble in the determined PRACH resource.

In addition, only when the UE initiates (performs) a random access procedure to a cell of a specific band (e.g., 4 Rx band) or a specific band of a cell, the UE may transmit a first random access preamble in a PRACH resource according to the limited PRACH resource configuration.

A UE receives a random access response (RAR) as a response to a first random access preamble from a base station (S1403).

Here, a random access response (RAR) may correspond to an RAR MAC CE and may be transmitted through a PDSCH.

The RAR includes a backoff indicator (BI). A UE may store a BI value included in the RAR.

In addition, a random access response (RAR) also includes a random access preamble identifier (RAPID). Upon receiving the RAR, a UE checks whether a RAPID for (and associated with) a first random access preamble transmitted by the UE in an RAR is identified. In other words, a UE receiving an RAR checks whether a RAPID included in an RAR matches (includes) a RAPID for (and associated with) a first random access preamble transmitted by the UE.

If the RAR does not include the RAPID associated with the first random access preamble (if not identified), a UE transmits a second random access preamble to a base station (S1440).

That is, a UE starts a new random access procedure.

Here, a UE may transmit a second random access preamble after a back-off time indicated by a BI in an RAR (i.e., after performing back-off with a value indicated by a BI).

Specifically, when the UE is a specific type of UE, the UE may perform transmission after a back-off time in which a scaling factor for a BI indicated in configuration information is applied to a BI in the RAR (i.e., after determining a back-off time by applying a scaling factor to a value indicated by a BI, and performing back-off as much as the determined back-off time). For example, after a time when a scaling factor is multiplied by a value indicated by a BI, the UE may transmit a second random access preamble.

As described above, different scaling factors may be applied to each type of the specific type of UE. In this case, in the configuration information, a scaling factor for a BI for each type of UE may be configured/indicated separately, a UE may determine a backoff time by applying a scaling factor corresponding to its type to a BI of an RAR.

In addition, different scaling factors may be applied according to an RSRP value measured by a UE. For example, different scaling factors may be applied depending on whether an RSRP value is greater than or equal to (or less than) a specific threshold. In this case, an RSRP threshold value and/or scaling factors for a plurality of BIs may be configured/indicated in configuration information. In this case, a UE may determine a scaling factor based on the measured RSRP value and apply the determined scaling factor to a BI of an RAR to determine a backoff time.

In addition, only when the UE initiates (performs) a random access procedure to a cell of a specific band (e.g., 4 Rx band) or a specific band of a cell, the UE may perform backoff during a backoff time derived by applying a scaling factor for a BI and transmit the second random access preamble.

Meanwhile, if an RAPID included in an RAR matches (includes) aa RAPID for (and associated with) a first random access preamble that it has transmitted, a UE may transmit UL-SCH (Shared Channel) data (message 3) through a PUSCH according to UL scheduling information and a timing offset value in an RAR and perform a subsequent random access procedure.

Figure 15:
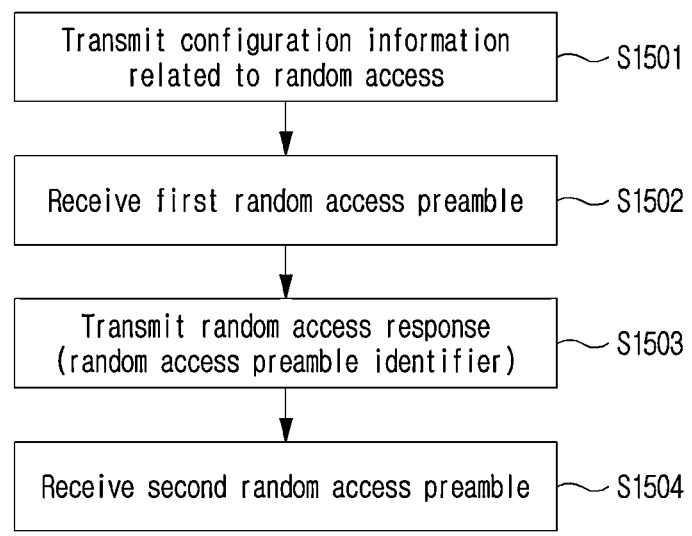
FIG. 15 is a diagram illustrating an operation of a base station for a method for performing a random access procedure according to an embodiment of the present disclosure.

FIG. 15 is a diagram illustrating an operation of a base station for a method for performing a random access procedure according to an embodiment of the present disclosure.

FIG. 15 illustrates an operation of a base station based on the method proposed above. The example of FIG. 15 is for convenience of description and does not limit the scope of the present disclosure. Some step(s) illustrated in FIG. 15 may be omitted depending on circumstances and/or settings. In addition, the base station in FIG. 15 is just one example and may be implemented as a device illustrated in FIG. 16 below. For example, the processor 102/202 of FIG. 16 may control to transmit and receive channels/signals/data/information, etc. (e.g., RRC signaling, MAC CE, DCI for UL/DL scheduling, SRS, PDCCH, PDSCH, PUSCH, PUCCH, PHICH, etc.) using the transceiver 106/206 and to store transmitted or received channels/signals/data/information in the memory 104/204.

Referring to FIG. 15, a base station transmits configuration information related to random access to a UE (S1501).

Here, the configuration information related to random access may be cell-specific configuration information related to random access (e.g., RACH-ConfigCommon or RACH-ConfigCommonTwoStepRA) or may be UE-dedicated configuration information related to random access (e.g., RACH-ConfigDedicated).

The configuration information may be transmitted through higher layer signaling (e.g., RRC signaling).

Specifically, when the configuration information related to random access is cell-specific configuration information related to random access, the configuration information related to random access may be transmitted through system information. In addition, as described above, separate system information may be configured for each of a normal UE and an R-UE (i.e., a specific type of UE), and the configuration information related to random access may be transmitted through system information (e.g., R-SIB1) configured for an R-UE.

In addition, the configuration information related to random access may include a scaling factor for a backoff indicator (BI).

As described above, a UE receiving the configuration information may correspond to a specific type of UE (e.g., R-UE) having a reduced or limited capability compared to a normal UE such as a R-UE supporting a reduced capability compared to an existing UE, a UE capable of access limited to a specific network slice, a UE supporting a special/limited capability based on a feature set, etc.

In addition, this specific type of UE may be defined as a plurality of types according to a capability supported by a UE (e.g., among R-UE, a first type of R-UE, a second type of R-UE, etc.) (another example, a first type of UE corresponding to an R-UE, a second type of UE capable of accessing only to a specific slice). In this case, different scaling factors may be applied to each type of the specific type of UE. In this case, in the configuration information, a scaling factor for a backoff indicator (BI) may be separately configured/indicated for each UE type.

In addition, different scaling factors may be applied according to an RSRP value measured by a UE. For example, different scaling factors may be applied depending on whether an RSRP value is greater than or equal to (or less than) a specific threshold. In this case, an RSRP threshold value and/or scaling factors for a plurality of backoff indicators (BIs) may be configured/indicated in configuration information.

In addition, a PRACH resource may be limitedly configured for the specific type of UE. For example, the PRACH resource may be limitedly configured by a RAPID and/or a PRACH mask index for random access resource selection for the specific type of UE. In this case, in the configuration information, a value may be indicated/configured only within specific RAPID candidates and/or PRACH mask index candidates for the specific type of UE. In addition, when the specific type of UE is defined as a plurality of types, an RAPID and/or a PRACH mask index may be configured differently (individually) for each type, and different (individual) PRACH resources may be configured/indicated based on an RAPID and/or a PRACH mask index for each UE type by the configuration information.

Alternatively, as described above, an amount (or location) of the PRACH resource may be configured differently for each type of the specific type of UE or according to an RSRP measurement value of a serving cell. For example, the PRACH resource may be configured in different slots for each frame in which the PRACH resource is configured. In this case, the configuration information may include information for configuring a limited PRACH resource for the specific type of UE. In addition, when the specific type of UE is defined as a plurality of types, a PRACH resource may be configured for each type, and information for PRACH resource configuration for each UE type may be individually configured/indicated in the configuration information.

A configuration for the limited scaling factor of a BI and/or a PRACH resource configuration may be configured to be applied only to a cell of a specific band (e.g., 4 Rx band) or a random access procedure to a specific band of a cell.

A base station receives a first random access preamble from a UE (S1502).

Here, a first random access preamble may be transmitted through a PRACH resource.

As described above, when a UE is a specific type of UE, a first random access preamble may be received through a limited PRACH resource configured by configuration information. For example, through a PRACH resource configured by a RAPID and/or a PRACH mask index for random access resource selection for the specific type of UE, a base station may receive a first random access preamble.

In addition, when the specific type of UE is defined as a plurality of types, a PRACH resource may be separately configured for each type. Alternatively, when the specific type of Ue is defined as a plurality of types, an amount (or location) of the PRACH resource may be configured differently for each type. In this case, a base station may receive a first random access preamble from a UE through a PRACH resource corresponding to the type of the UE. In addition, a base station may know a type of the UE through the PRACH resource through which the first random access preamble is received from the UE.

In addition, an amount (or location) of the PRACH resource may be configured differently according to an RSRP measurement value of a serving cell of a UE. A base station may transmit a first random access preamble in the PRACH resource determined by the UE. The base station can know an RSRP value measured by the UE through the PRACH resource through which the first random access preamble is received from the UE.

In addition, only when the UE initiates (performs) a random access procedure to a cell of a specific band (e.g., 4 Rx band) or a specific band of a cell, the base station may receive a first random access preamble from the UE in a PRACH resource according to the limited PRACH resource configuration.

A base station transmits a random access response (RAR) to a UE as a response to a first random access preamble (S1503).

Here, a random access response (RAR) may correspond to an RAR MAC CE and may be transmitted through a PDSCH.

The RAR includes a backoff indicator (BI) and a random access preamble identifier (RAPID).

Upon receiving the RAR, a UE checks whether a RAPID for (and associated with) a first random access preamble transmitted by the UE in an RAR is identified. In other words, a UE receiving an RAR checks whether a RAPID included in an RAR matches (includes) a RAPID for (and associated with) a first random access preamble transmitted by the UE.

If the RAR does not include the RAPID associated with the first random access preamble (if not identified), a base station receives a second random access preamble from a UE (S1540).

That is, a new random access procedure is initiated by a UE.

Here, a base station may receive a second random access preamble after a back-off time indicated by a BI in an RAR (i.e., after performing back-off with a value indicated by a BI).

Specifically, when the UE is a specific type of UE, the base station may receive transmission after a back-off time in which a scaling factor for a BI indicated in configuration information is applied to a BI in the RAR (i.e., after determining a back-off time by applying a scaling factor to a value indicated by a BI, and performing back-off as much as the determined back-off time). For example, after a time when a scaling factor is multiplied by a value indicated by a BI, a base station may transmit a second random access preamble from the UE. Here, the base station may know a type of the UE through the timing at which the second random access preamble is received from the UE.

As described above, different scaling factors may be applied to each type of the specific type of UE. In this case, in the configuration information, a scaling factor for a BI for each type of UE may be configured/indicated separately, a base station may receive a second random access preamble from the UE after a backoff time by applying a scaling factor corresponding to a type of the UE to a BI of an RAR. In addition, the base station may know a type of the UE through the PRACH resource through which a second random access preamble is received from the UE. In addition, the base station may know a type of the UE through the timing at which a second random access preamble is received from the UE.

In addition, different scaling factors may be applied according to an RSRP value measured by a UE. For example, different scaling factors may be applied depending on whether an RSRP value is greater than or equal to (or less than) a specific threshold. In this case, an RSRP threshold value and/or scaling factors for a plurality of BIs may be configured/indicated in configuration information. In this case, the base station may receive a second random access preamble after a backoff time derived by applying a scaling factor determined by the UE to a BI of an RAR. Here, the base station may know an RSRP value measured by the UE through the time at which a second random access preamble is received from the UE.

In addition, only when the UE initiates (performs) a random access procedure to a cell of a specific band (e.g., 4 Rx band) or a specific band of a cell, a base station may receive the second random access preamble after backoff during a backoff time derived by applying a scaling factor for a BI.

Meanwhile, if an RAPID included in an RAR matches (includes) aa RAPID for (and associated with) a first random access preamble that it has transmitted, a base station may receive UL-SCH (Shared Channel) data (message 3) through a PUSCH according to UL scheduling information and a timing offset value in an RAR from a UE and perform a subsequent random access procedure.

General Device to which the Present Disclosure May be Applied

Figure 16:
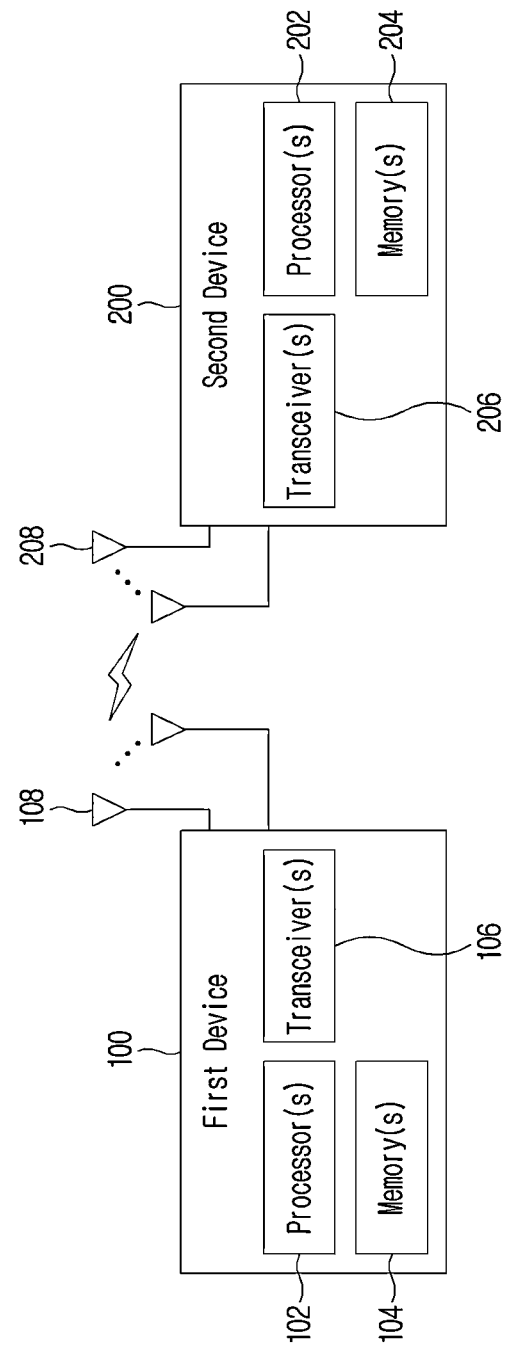
FIG. 16 illustrates a block diagram of a wireless communication device according to an embodiment of the present disclosure.

FIG. 16 is a diagram which illustrates a block diagram of a wireless communication device according to an embodiment of the present disclosure.

In reference to FIG. 16, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method performed by a reduced capability (redcap) user equipment (UE) in a wireless communication system, the method comprising:
receiving, from a base station, first configuration information related to random access, wherein the first configuration information includes a first scaling factor for a back-off indicator (BI);
transmitting, to the base station, a first random access preamble;
receiving, from the base station, a random access response (RAR), wherein the RAR includes the BI; and
transmitting, to the base station, a second random access preamble based on the RAR not including a random access preamble identifier (RAPID) associated with the first random access preamble,
wherein based on second configuration information related to random access only for the redcap UE being provided from the base station, the second random access preamble is transmitted after a random backoff time determined based on a value obtained by multiplying the BI by a second scaling factor of the second configuration information, and
wherein based on the second configuration information not being provided from the base station, the second random access preamble is transmitted after a random backoff time determined based on a value obtained by multiplying the BI by the first scaling factor of the first configuration information.

2. The method of claim 1, wherein based on a redcap UE being defined as a plurality of types according to a capability supported by a redcap UE, the second scaling factor is individually configured for each type.

3. The method of claim 1, wherein the second scaling factor is individually configured according to a reference signal received power (RSRP) measurement value of a serving cell.

4. The method of claim 1, wherein the first random access preamble and the second random access preamble are transmitted only in a physical random access channel (PRACH) resource configured for the redcap UE.

5. The method of claim 4, wherein the PRACH resource is configured by an RAPID and/or a PRACH mask index for selecting a random access resource for the redcap UE.

6. The method of claim 4, wherein an amount of the PRACH resource is configured differently for each type of a redcap UE or according to a reference signal received power (RSRP) measurement value of a serving cell.

7. The method of claim 4, wherein the PRACH resource is configured in different slots for each frame in which the PRACH resource is configured.

8. A reduced capability (redcap) user equipment (UE) operating in a wireless communication system, the redcap UE comprising:
at least one transceiver for transmitting and receiving a wireless signal; and
at least one processor for controlling the at least one transceiver,
wherein the at least one processor configured to:
receive, from a base station, first configuration information related to random access, wherein the first configuration information includes a first scaling factor for a back-off indicator (BI);
transmit, to the base station, a first random access preamble;
receive, from the base station, a random access response (RAR), wherein the RAR includes the BI; and transmit, to the base station, a second random access preamble based on the RAR not including a random access preamble identifier (RAPID) associated with the first random access preamble, wherein based on second configuration information related to random access only for the redcap UE being provided from the base station, the second random access preamble is transmitted after a random backoff time determined based on a value obtained by multiplying the BI by a second scaling factor of the second configuration information, and wherein based on the second configuration information not being provided from the base station, the second random access preamble is transmitted after a random backoff time determined based on a value obtained by multiplying the BI by the first scaling factor of the first configuration information.

* * * * *